(12) United States Patent
Lipscomb et al.

(10) Patent No.: US 9,143,809 B2
(45) Date of Patent: *Sep. 22, 2015

(54) DEVICE ASSOCIATED WITH A USER ACCOUNT

(75) Inventors: Kenneth O Lipscomb, Marietta, GA (US); John B. Petritis, Lawrenceville, GA (US); Richard D. Robison, Decatur, GA (US); Kelly P. Morrison, Atlanta, GA (US); Michael D. Hirsch, Atlanta, GA (US); Eric Neal Muntz, Marietta, GA (US); John Paul Whitehead, III, Atlanta, GA (US)

(73) Assignee: Zapmedia Services, Inc., Atlanta, GA (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/420,232

(22) Filed: May 25, 2006

(65) Prior Publication Data

US 2006/0206492 A1      Sep. 14, 2006

Related U.S. Application Data

(60) Division of application No. 11/162,716, filed on Sep. 20, 2005, now Pat. No. 7,343,414, which is a continuation of application No. 09/679,688, filed on Oct. 5, 2000, now Pat. No. 7,020,704.

(Continued)

(51) Int. Cl.
*G06F 15/16* (2006.01)
*H04N 21/231* (2011.01)
(Continued)

(52) U.S. Cl.
CPC .... *H04N 21/23109* (2013.01); *G06F 17/30035* (2013.01); *G06F 17/30038* (2013.01);
(Continued)

(58) Field of Classification Search
USPC ................ 709/223–226, 225–229, 203, 250; 715/716, 730; 707/10, 100
See application file for complete search history.

(56) References Cited

U.S. PATENT DOCUMENTS 4,471,379 A   9/1984   Stephens
4,667,088 A   5/1987   Kramer et al.
(Continued)

FOREIGN PATENT DOCUMENTS

EP    0355697 B1    3/1995
EP    0765062 A2    3/1997
(Continued)

OTHER PUBLICATIONS

Litigation: Law suit filed by Zapmedia Services, Inc. against Apple, Inc. for the infringement of United States Patent Nos. 7,020,704 and 7,343,414, filed on Mar. 12, 2008 in the United States District Court for the Eastern district of Texas, Marshall Division.

(Continued)

*Primary Examiner* — Zarni Maung
(74) *Attorney, Agent, or Firm* — Smith Risley Tempel Santos LLC; Gregory Scott Smith

(57) ABSTRACT

A system and method for distributing digital media assets to a plurality of users. A portal is provided comprising at least one server computer. The portal executes a media library database server application that manages access a master library of media 5 assets that can be accessed by users via one or more communication networks. A plurality of media player devices communicate with the portal to access media assets for use. Each media player device may comprise a processor that executes a database client application that manages media assets licensed for use by a user.

13 Claims, 11 Drawing Sheets

Related U.S. Application Data

(60) Provisional application No. 60/157,736, filed on Oct. 5, 1999, provisional application No. 60/176,833, filed on Jan. 19, 2000, provisional application No. 60/177,063, filed on Jan. 19, 2000, provisional application No. 60/177,783, filed on Jan. 24, 2000, provisional application No. 60/177,884, filed on Jan. 24, 2000, provisional application No. 60/176,830, filed on Jan. 19, 2000, provisional application No. 60/176,829, filed on Jan. 19, 2000, provisional application No. 60/177,867, filed on Jan. 24, 2000.

(51) Int. Cl.
| | |
|---|---|
| *H04L 29/08* | (2006.01) |
| *G06F 17/30* | (2006.01) |
| *G11B 27/034* | (2006.01) |
| *G11B 27/10* | (2006.01) |
| *G11B 27/11* | (2006.01) |
| *H04N 7/173* | (2011.01) |
| *H04N 21/254* | (2011.01) |
| *H04N 21/258* | (2011.01) |
| *H04N 21/433* | (2011.01) |
| *H04N 21/61* | (2011.01) |
| *H04N 21/8355* | (2011.01) |
| *G06F 12/00* | (2006.01) |

(52) U.S. Cl.
CPC ........ *G06F17/30053* (2013.01); *G11B 27/034* (2013.01); *G11B 27/105* (2013.01); *G11B 27/11* (2013.01); *H04L 29/08144* (2013.01); *H04N 7/17318* (2013.01); *H04N 21/23106* (2013.01); *H04N 21/2541* (2013.01); *H04N 21/25866* (2013.01); *H04N 21/4332* (2013.01); *H04N 21/6175* (2013.01); *H04N 21/8355* (2013.01); *G11B 2220/216* (2013.01); *G11B 2220/2545* (2013.01); *G11B 2220/2562* (2013.01)

(56) References Cited

U.S. PATENT DOCUMENTS

| | | | |
|---|---|---|---|
| 4,796,220 A | 1/1989 | Wolfe | |
| 4,949,187 A | 8/1990 | Cohen | |
| 5,132,992 A | 7/1992 | Yurt et al. | |
| 5,231,511 A | 7/1993 | Kodama et al. | |
| 5,347,632 A | 9/1994 | Filepp et al. | |
| 5,371,532 A | 12/1994 | Gelman et al. | |
| 5,426,427 A | 6/1995 | Chinnock et al. | |
| 5,475,758 A | 12/1995 | Kikuchi | |
| 5,550,735 A | 8/1996 | Slade et al. | |
| 5,550,976 A * | 8/1996 | Henderson et al. | ........... 709/201 |
| 5,557,541 A | 9/1996 | Schulhof et al. | |
| 5,600,364 A | 2/1997 | Hendricks et al. | |
| 5,613,092 A | 3/1997 | Lim et al. | |
| 5,631,850 A | 5/1997 | Tanaka et al. | |
| 5,636,276 A | 6/1997 | Brugger | |
| 5,638,443 A | 6/1997 | Stefik et al. | |
| 5,649,013 A | 7/1997 | Stuckey et al. | |
| 5,659,350 A | 8/1997 | Hendricks et al. | |
| 5,666,411 A | 9/1997 | McCarty | |
| 5,682,195 A | 10/1997 | Hendricks et al. | |
| 5,682,460 A | 10/1997 | Hyziak et al. | |
| 5,691,494 A | 11/1997 | Sai et al. | |
| 5,691,964 A | 11/1997 | Niederlein et al. | |
| 5,710,922 A | 1/1998 | Alley et al. | |
| 5,715,403 A | 2/1998 | Stefik | |
| 5,728,960 A | 3/1998 | Sitrick | |
| 5,734,719 A | 3/1998 | Tsevdos et al. | |
| 5,734,823 A | 3/1998 | Saigh et al. | |
| 5,734,853 A | 3/1998 | Hendricks et al. | |
| 5,734,961 A | 3/1998 | Castille | |
| 5,737,538 A | 4/1998 | Wilhite | |
| 5,740,361 A | 4/1998 | Brown | |
| 5,740,549 A | 4/1998 | Reilly et al. | |
| 5,748,956 A | 5/1998 | Lafer et al. | |
| 5,751,672 A | 5/1998 | Yankowski | |
| 5,754,306 A | 5/1998 | Taylor et al. | |
| 5,758,257 A | 5/1998 | Herz et al. | |
| 5,790,423 A | 8/1998 | Lau et al. | |
| 5,798,785 A | 8/1998 | Hendricks et al. | |
| 5,802,518 A | 9/1998 | Karaev et al. | |
| 5,809,145 A * | 9/1998 | Slik et al. | ........... 705/52 |
| 5,819,036 A | 10/1998 | Adams | |
| 5,828,837 A | 10/1998 | Eikeland | |
| 5,835,721 A | 11/1998 | Donahue et al. | |
| 5,859,898 A | 1/1999 | Checco | |
| 5,862,325 A | 1/1999 | Reed et al. | |
| 5,864,620 A | 1/1999 | Pettitt | |
| 5,892,508 A | 4/1999 | Howe et al. | |
| 5,926,624 A | 7/1999 | Katz et al. | |
| 5,940,504 A | 8/1999 | Griswold | |
| 5,956,716 A | 9/1999 | Kenner et al. | |
| 5,990,927 A | 11/1999 | Hendricks et al. | |
| 6,006,274 A | 12/1999 | Hawkins et al. | |
| 6,014,651 A | 1/2000 | Crawford | |
| 6,049,670 A | 4/2000 | Okada et al. | |
| 6,091,956 A | 7/2000 | Hollenberg | |
| 6,167,441 A | 12/2000 | Himmel | |
| 6,181,336 B1 | 1/2001 | Chiu | |
| 6,199,077 B1 | 3/2001 | Inala et al. | |
| 6,226,617 B1 | 5/2001 | Downs | |
| 6,226,618 B1 | 5/2001 | Downs et al. | |
| 6,256,623 B1 | 7/2001 | Jones | |
| 6,330,675 B1 | 12/2001 | Wiser et al. | |
| 6,345,256 B1 | 2/2002 | Milsted et al. | |
| 6,366,907 B1 | 4/2002 | Fanning et al. | |
| 6,385,596 B1 | 5/2002 | Wiser et al. | |
| 6,388,957 B2 | 5/2002 | Yankowski | |
| 6,438,235 B2 | 8/2002 | Sims, III | |
| 6,446,080 B1 | 9/2002 | Van Ryzin et al. | |
| 6,452,609 B1 | 9/2002 | Katinsky et al. | |
| 6,516,337 B1 | 2/2003 | Tripp et al. | |
| 6,529,864 B1 * | 3/2003 | Chase | ............. 704/9 |
| 6,553,178 B2 * | 4/2003 | Abecassis | ........... 386/291 |
| 6,598,230 B1 | 7/2003 | Ballhorn | |
| 6,631,359 B1 | 10/2003 | Braitberg et al. | |
| 6,643,669 B1 | 11/2003 | Novak et al. | |
| 6,882,979 B1 | 4/2005 | Reay et al. | |
| 6,915,265 B1 * | 7/2005 | Johnson | ........... 705/2 |
| 6,963,920 B1 | 11/2005 | Hohmann et al. | |
| 6,973,662 B1 | 12/2005 | Sie | |
| 6,983,480 B1 | 1/2006 | Sie | |
| 7,024,679 B1 | 4/2006 | Sie | |
| 7,047,241 B1 * | 5/2006 | Erickson | ............. 1/1 |
| 7,069,575 B1 | 6/2006 | Goode et al. | |
| 7,209,892 B1 | 4/2007 | Galuten et al. | |
| 7,228,559 B1 | 6/2007 | Sie | |
| 7,240,359 B1 | 7/2007 | Sie | |
| 7,308,462 B1 * | 12/2007 | Clarkson et al. | ............. 1/1 |
| 7,343,414 B2 * | 3/2008 | Lipscomb et al. | ........... 709/226 |
| 7,346,687 B2 | 3/2008 | Lipscomb et al. | |
| 8,175,977 B2 * | 5/2012 | Story et al. | ........... 705/59 |
| 2002/0026442 A1 | 2/2002 | Lipscomb et al. | |
| 2002/0046181 A1 * | 4/2002 | Story et al. | ........... 705/59 |
| 2002/0055934 A1 | 5/2002 | Lipscomb et al. | |
| 2002/0095510 A1 | 7/2002 | Sie | |
| 2006/0078112 A1 * | 4/2006 | Meyers | ........... 380/201 |
| 2006/0206492 A1 | 9/2006 | Lipscomb et al. | |
| 2007/0240193 A1 | 10/2007 | Sie et al. | |

FOREIGN PATENT DOCUMENTS

| | | |
|---|---|---|
| EP | 0982732 A1 | 3/2000 |
| JP | 405167590 A | 7/1993 |
| JP | 406169435 A | 6/1994 |
| JP | 406180927 A | 6/1994 |
| JP | 408032892 A | 2/1996 |
| JP | 408167228 A | 6/1996 |
| WO | WO 96/27155 | 9/1996 |
| WO | WO 99/13417 A1 | 3/1999 |

(56) References Cited

FOREIGN PATENT DOCUMENTS

| WO | WO 99/27681 A2 | 6/1999 |
|---|---|---|
| WO | WO 00/72460 A1 | 11/2000 |
| WO | WO 01/22730 A1 | 3/2001 |
| WO | WO 01/25948 A1 | 4/2001 |
| WO | WO 01/27773 A1 | 4/2001 |
| WO | WO 01/53963 A1 | 7/2001 |

OTHER PUBLICATIONS

Non-published pending U.S. Appl. No. 09/687,151, filed Oct. 12, 2000.
Non-published pending U.S. Appl. No. 09/687,157, filed Oct. 12, 2000.
Non-published abandoned U.S. Appl. No. 09/687,877, filed Oct. 12, 2000.
Non-published pending U.S. Appl. No. 11/076,450, filed Mar. 8, 2005.
Non-published abandoned U.S. Appl. No. 09/687,142, filed Oct. 12, 2000.
U.S. Appl. No. 60/163,324, filed Nov. 3, 1999.
U.S. Appl. No. 60/159,202, filed Oct. 13, 1999.
U.S. Appl. No. 60/159,469, filed Oct. 13, 1999.
U.S. Appl. No. 60/157,736, filed Oct. 5, 1999, Lipscomb et al.
U.S. Appl. No. 60/176,829, filed Jan. 19, 2000, Lipscomb.
U.S. Appl. No. 60/176,830, filed Jan. 19, 2000, Lipscomb.
U.S. Appl. No. 60/176,833, filed Jan. 19, 2000, Lipscomb.
U.S. Appl. No. 60/177,063, filed Jan. 19, 2000, Lipscomb.
U.S. Appl. No. 60/177,700, filed Jan. 24, 2000, Lipscomb.
U.S. Appl. No. 60/177,701, filed Jan. 24, 2000, Lipscomb.
U.S. Appl. No. 60/177,783, filed Jan. 24, 2000, Lipscomb et al.
U.S. Appl. No. 60/177,867, filed Jan. 24, 2000, Lipscomb et al.
U.S. Appl. No. 60/177,884, filed Jan. 24, 2000, Lipscomb et al.
3COM Corp., Handbook for the Palm III™ Organizer (1998); and Palm, Support Resources for Older Palm Products, Article ID: 47831, Dec. 22, 2008.
Atlanta Business Chronicle, ZapMedia channels TV, music into one, http://atlanta.bizjournals.com/atlanta/stories/2000/05/22/focus14.html?t=printable, 1-4, 2000.
Atlanta Business Chronicle, ZapMedia forges alliance with L.A. Internet movie firm, http://atlanta.bizjjournals.com/atlanta/stories/2000/08/28/daily4.html, 1-2, 2000.
David Bainbridge, Craig G. Nevill-Manning, Ian H. Witten, Lloyd A. Smith, & Rodger J. McNab, Towards a Digital Library of Popular Music, ACM, at 161-169 (1999).
Defendant Apple, Inc's Answer, Affirmative Defenses, and Counterclaims to Plaintiffs Original Complaint, Case No. 2:08-CV—104-DF-CE, May 8, 2008.
Device profile: ZapMedia ZapStation. http://www.linux devices.com/articles/AT4964710304.html, 1-2, 2002.
Files From the FBI—Bulletin Boards and Badges: Rusty & Edie's BBS Seized by the FBI, http://textfiles.comlbbs/r&estory.txt (Feb. 9, 2009) (hereafter "BBS—FBI"); and Wikipedia, Rusty n Edie's BBS, ttp://en.wikipedia.org/wikilRusty_n_Edie%27s_BBS (Feb. 9, 2009) (hereafter "BBS—Wikipedia"); and Playboy Enterprises, Inc. v. Russ Hardenburgh, Inc., 982 F. Supp. 503 (N.D. Ohio 1997). ("Playboy").
HighBeam Research, 'If You Build It, They Will Hum . . . '. MP3.Com and Zapmedia Team to Create Personalized Multi Access Digital Music Enfironment, http://www.highbeam.com/DocPrint.aspx?DocId=1G1:66146670, 1-3, 2000.
HighBeam Research, 2001 International CES Draws Impressive List of First-Time Exhibitors. http://www.highbeam.com/DocPrint.aspx?DocId=1G1:68319971, 1-3, 2000.
HighBeam Research, ADVISORY/Top Industry Executives to Keynote Kagan VOD Summit. http://www.highbeam.com/DocPrint.aspx?DocId=1G1:83526049, 1-5, 2002.
HighBeam Research, ANT Fresco Browser Enables Armchair Internet Access Via Interisa's Digital Set-Top Box; Interisa Now Shipping 15,000 Units a Month. http://www.highbeam.com/DocPrint.aspx ?DocId=1G1:77023083, 1-3, 2001.
HighBeam Research, ANT Fresco Browser Ported to STMicroelectronics' OMEGA Family Reference Design Hardware and STAPI Software; Cost-Effective Product Development Made Quicker and Easier With Demonstration Port., http://www.highbeam.com/DocPrint.aspx?DocId=1G1 :70432551, 1-3, 2001.
HighBeam Research, ANT Fresco Browser to Enable Internet Browsing Capabilities in ZapMedia's ZapStation Hardware Reference Design; To be Showcased at CES 2001 Booth No. 1781., http://www.highbeam.com/DocPrint.aspx?DocId=1G1:68676688, 1-3, 2001.
HighBeam Research, Building a Business on Betty Boop. http://www.highbeam.com/DocPrint.aspx?DocId=1G1:76995271, 1-3, 2001.
HighBeam Research, Customized Audio/Video Jukebox Brings New Meaning to Home Entertainment. http://www.highbeam.com/DocPrint.aspx?DocId=1G1:80107324, 1-2, 2001.
HighBeam Research, Echelon Showcases Home Networking Technology at Excite@Home's Broadband LIVE! Event. http://www.highbeam.com/DocPrint.aspx?DocId=1G1:74508383, 1-2, 2001.
HighBeam Research, Innovations, http://www.highbeam.com/DocPrint.aspx?DocId=1P1:38798299, 1-5, 2000.
HighBeam Research, InterVideo's LinDVD Selected for ZapStation Universal Media Player Technology Powers DVD Playback in Breakthrough Digital Media Appliance., http://www.highbeam.com/DocPrint.aspx?DocId=1G1:6631845 , 1-3, 2000.
HighBeam Research, It's Put Up or Shut Up for ZapMedia. http://www.highbeam.com/DocPrint.aspx?DocId=1G1:81602197, 1-2, 2002.
HighBeam Research, Journey to the center of it all. (Always On). (development of digital video records)(Brief Article) http://www.highbeam.com/DocPrint.aspx?DocId=1G1:83915664, 1-3, 2002.
HighBeam Research, Kelly'S 1: Keeping You Up to Speed on the Net' .(Features), http://www.highbeam.com/DocPrint.aspx?DocId=1G1:65266879, 1-2, 2000.
HighBeam Research, Max Broadcasting Network and OmniSky Deliver Real Time NFL and MLB Content to Wireless—Mobile—Users., http://www.highbeam.com/DocPrint.aspx?DocId=1G1:67679585, 1-3, 2000.
HighBeam Research, MediaX's amuZnet.com Hosts Live Audio Chat With *NSYNC's Chris Kirkpatrick to Discuss New FuMan Skeeto Clothing Lines and Exclusive contest; Fashion Show on the Net to Follow. http://www.highbeam.com/DocPrint.aspx?DocId=1G1:70425066, 1-3, 2001.
HighBeam Research, Really Big Film Corp Retains MediaX to Spearhead Online Marketing Campaign for Giant-Screen Concert Film '*NSYNC Bigger Than Live'. http://www.highbeam.com/DocPrint.aspx?DocId=1G1:72669653, 1-3, 2001.
HighBeam Research, Talk about convergence.(Brief Article), http://www.highbeam.com/DocPrint.aspx?DocId=1G1:64258801, 1, 2000.
HighBeam Research, Try a New Internet-Enabled Box http://www.highbeam.com/DocPrint.aspx?DocId=1P1:49353006, 1-2, 2002.
HighBeam Research, TV online. A look at how the top station groups are developing their Internet plans, http://www.highbeam.com/DocPrint.aspx?DocId=1G1:6574403, 1-7, 2000.
HighBeam Research, VC Market Shows Faith in ANT to Sum of $3.6 Million; Total Investment in ANT to Date Now $11.9 Million. http://www.highbeam.com/DocPrint.aspx?DocId=1G1:768380 6, 1-2, 2001.
HighBeam Research, Web films could press cable VOD in future. (Broadband Content). http://www.highbeam.com/DocPrint.aspx?DocId=1G1:80191602, 1-2, 2001.
HighBeam Research, ZapMedia and EarthLink Sign Broadband Marketing and Distribution Agreement; EarthLink to Become ZapMedia's First Broadband Connectivity Partner., http://www.highbeam.com/DocPrint.aspx?DocId=1G1:68270131, 1-2, 2000.
HighBeam Research, ZapMedia partners with EarthLink—Atlanta Business Chronicle: http://www.highbeam.com/DocPrint.aspx?DocId=1S1:1202030001433101, 1, 2000.
iApplianceweb-OEG, Susan Hospod, ZapStation, http://www.iapplianceweb.com/appreview/audio_players_24.html, 1-2.

(56) References Cited

OTHER PUBLICATIONS

Jack Lacy, James H. Snyder, & David P. Maher, Music on the Internet and the Intellectual Property Protection Problem, Proceedings of the IEEE International Symposium on Industrial Electronics, vol. 1, SS77-SS83 (1997).
L. Aguilar, J.J. Garcia-Luna-Aceves, D. Moran, E.J. Craighill, & R. Brungardt, Architecture for a Multimedia Teleconferencing System, ACM, 126-136 (1986).
Los Angeles & Atlanta—(Business Wire) ANT Fresco Browser to Enable Internet Browsing Capabilities in ZapMedia's ZapStation Hardware Reference Design; To be Showcased at CES 2001 Booth No. 1781; http://findarticles.com/p/articles/mi_m0EIN/is_2001_Jan_3/ai_68676688/print, 1-2, 2001.
Slashdot, ZapStation CD/MP3/DVD Player/Server, http://hardware.slashdot.org/article.pl?no_d2=1&sid,00/09/22/222322, 1-4, 2000.
Stefano Antoniazzi & Gottfried Schapeler, An Open Software Architecture for Multimedia Consumer Terminals, in Multimedia Applications, Services and Techniques—ECMAST'97 621 (Serge Fdida & Michele Morganti eds., May 1997).
Steve Davis, CompuServe Complete Handbook & Membership Kit (1998)
Using subtitles and alternative audio tracks, To use subtitles and alternative audio tracks: while you're playing a movie in iTunes, choose Controls > Audio & Subtitles > [Option]. file:///Users/lissy/Documents/**Work/iTunes/iT%207.6/iTunesHelp-81.1...es.app/Contents/Resources/English.lproj/iTunes%20Help/pgs/20868.html.
ZapMedia ZapStation/Harman Kardon DMC 100, http://www.linuxjournal.com/articie/4526, 1-3, 2001.
Over Your Cable Channels, Cox Communications Channel Line Up.
Cox Cable vs. Satellite TV Who's the Real Champ?
Inside: How to clean up big time!
What . . . Here's Your Change to Find Out!
Cox Communications is Unveiling Big Things!
Question: What is absolutely clear, totally interactive and over 200?
Introducing COX Wirelink.
Your Cable TV Company is Changing to Cox Communications.
Cox Communications Advertisement—Free installation.
Expect.
Star Sight.
Cox Communications Advertisement—Free installation (2).
Join the Revolution.
Cox Digital Channel lineup.
Join the Digital TV Revolution.
It's a Revolution in Digital TV.
www.HolyMoley.com.
It's a Revolution in Digital TV (2).
Join the Digital TV Revolution (2).
Happy Holidays from Cox Communications.
We've got you covered.
We've got a monstrously good time in store for you enter if you dare.
With Cox Digital TV Deluxe Get 8 Channels for the price of HBO.
Simplify you live and take Control.
Same TV new experience.
Push the button, choose a movie, it's that simple . . . .
Cox Digital Cable, It's not more TV, It's better TV.
Cox Digital Cable, It's not more TV, It's better TV (2).
New Year new experience, last chance to experience it for $49.
Making life easier.
Discover a new view with Cox.
Lader A Ranch, Oak Knoll Village Club.
Magic from Morning till Night.
It began with a man, a mouse, and a little Magic.
Cast Off for a bundle of fun.
Think you've done Digital? Not until you've tried Cod in Demand pay-per-view . . . .
Cox Digital Cable takes you beyond ordinary TV.
Magic from Morning till Night (2).
A new spectrum of choices.
Cox Colleen Langer.
Simplify your life.
Mega Movies in demand.
Cox digital TV delivers a universe of programming choices.
Articles, documents, advertisements for Time Warner Cable's Full Service Network.
Gail Belles, Privace and Security Protections for Healthcare Information, in Computerizing Large Integrated Health Networks p. 116 (Robert M. Kolodner ed. 1997).
Compuserve Information Manager: The Complete Sourcebook, A Bantam Book, Sep. 1990.
Audible Manager Software User's Guide (1997).
Hughes Network Systems Model: HIRD-D2—Digital Satellite Receiver Owner's Manual (c) 1998.
M. Crispin, Internet Message Access Protocol—Version 4, rev. 1 (Dec. 1996).
R. Austein, Synchronnization Operations for Disconnected IMAP4 Clients (Jun. 1994).
Time Warner Cable Full Service Network, "Time Warner Introduces World's First Full Service Network In Orlando" (Dec. 1994).
Time Warner Cable, "Development of a Full Service Network" (Denver, Feb. 11, 1993).
Mario P. Vecchi and Michael Adams of Time Warner Cable, "Traffic Management for Highly Interactive Transactional SYstem" (1995 NCTA Technical Papers).
Jul. 8, 2010 Declaration of Mr. William Overton Gilliam.
DADpro System Reference Manual Version 2.4e, 1998 by ENCO Systems.
Audible Inc. Announces Equity Investment by Compaq Computer Corporation, Hambrecht & Quist LLC, Business Wire, Mar. 30, 1998.
Andy Huffman Joins Audible Inc., As President and CEO, Business Wire, Mar. 30, 1998.
Andy Huffman Joins Audible Inc. as President and CEO, Financial Times Information, Mar. 30, 1998.
Industry Leaders Select Most Innovative and Results-Oriented Uses of the Internet and network Technology, Business Wire, Mar. 10, 1998.
Industry Leaders Select Most Innovative and Results-Oriented Uses of the Internet and network Technology, Financial Times Information, Mar. 10, 1998.
To Business, Technology and Entertainment Editors, PR Newswire Association, Feb. 9, 1998.
Cyberscope SKED, Associated Press, Feb. 6, 1998.
Cyberscope, WorldSources Inc., Feb. 6, 1998.
Realnetworks, M2 Communications, Feb. 3, 1998.
Realnetworks & AUdible Inc. Deliver New Mobile Audio Solution for Corporate Intranets, Financial Times Information, Feb. 3, 1998.
1997 WebAwards Recognizes Award Winning Corporate Web Sites, PR Newswire Association, Feb. 2, 1998.
BroadVision, Inc. Announces Record Fourth Quarter 1997 Results, PR newswire Association, Inc., Jan. 29, 1998.
RealNetworks and Audible Inc. to Deliver New Mobile Audio Solution for Corporate Intranets; RealServer 5.0 to Interoperate with Audible Players; Allows Intranet Users to Access RealAudio for Mobile Play, PR Newswire Association, Jan. 26, 1998.
Audible launches Audible.com Store and Audible Player with special holiday offer, M2 Presswire, Dec. 17, 1997.
Audible Inc. Launces Audible.com Store and Audible Player with Special Holiday Offer.
Audible Inc. Launches Audible.com Store Built With BroadVision One-To-One, PR Newswire Association, Dec. 16, 1997.
Business and Financial News, Knight Ridder/Tribune News Service, Dec. 10, 1997, by David Hayes.
Yahoo!, Reuters NewMedia, Morningstar, PR Newswire and Third Age are Among Early Partners to Syndicate Internet Content through the NetEvents(SM) Network, PR Newswire Association, Sep. 17, 1997.
Progressive Networks and Audible Inc. Team up to Make RealAudio Mobile, Business Wire Inc., Sep. 15, 1997.
Audible to Offer On-Demand Audio Programming Via the Web for Mobile Playback, Business Wire, Jul. 30, 1997.
Audible Inc. S11 filing dated Apr. 26, 1999.
RA Bissell and A Eales, The set-top box for interactive services, BT Technol J vol. 13, No. 4 Oct. 1995.

(56) References Cited

OTHER PUBLICATIONS

Expert report of Dr. John P.J. Kelly regarding invalidity of U.S. Pat. No. 7343414.
Various screen shots of Audible System to accompany John Kelley Expert Report.
The Digital News System at EDUCOM: A convergence of Interactive Computing, Newspapers, Television and High-Speed Networks.
Apple Interactive Television Box, Setting up and using the equipment.
Building Network-based Interactive Media, Dean Blackketter & Greg Gretsch, Apple Computer Inc., 1993 IEEE.
U.S. Appl. No. 60/157,736, Oct. 5, 1999, Lipscomb et al.
U.S. Appl. No. 60/176,829, Jan. 19, 2000, Lipscomb.
U.S. Appl. No. 60/176,830, Jan. 19, 2000, Lipscomb.
U.S. Appl. No. 60/176,833, Jan. 19, 2000, Lipscomb.
U.S. Appl. No. 60/177,063, Jan. 19, 2000, Lipscomb.
U.S. Appl. No. 60/177,700, Jan. 24, 2000, Lipscomb.
U.S. Appl. No. 60/177,701, Jan. 24, 2000, Lipscomb.
U.S. Appl. No. 60/177,783, Jan. 24, 2000, Lipscomb et al.
U.S. Appl. No. 60/177,867, Jan. 24, 2000, Lipscomb et al.
U.S. Appl. No. 60/177,884, Jan. 24, 2000, Lipscomb et al.
Apple, Inc.'s Invalidity Contentions, Case No. 2:08-CV-104-DF-CE, filed Feb. 13, 2009, incl. Appendices 1-317 (claim charts for cited prior art).
3COM Corp., Handbook for the Palm III ™ Organizer (1998); and Palm, Support Resources for Older Palm Products, Article ID: 47831, Dec. 22, 2008.
Aesoon Park & Kyunghyu Lee, Software Architecture of Broadband Distribution in the Optical CATV Network, International Conference on Communication Technology Proceedings, vol. 1, 234-237 (1996).
Ahmed K. Elmagarmid et al., Video Database Systems: Issues, Products and Applications, 57-119 (1997).
Anna Hac & Dongchen Lu, Architecture, Design, and Implementation of a Multimedia Conference System, International Journal of Network Management, vol. 7, 64-83 (1997).
Apple Computer, Inc., Newton Connection Utilities User'S Manual for the Macintosh Operating System (1997).
Apple Computer, Inc., Apple Messagepad Handbook for Newton (1995).
Apple Computer, Inc., Newton Connection Utilities User'S Manual for Windows (1997).
Apple Computer, Inc., Newton Press User'S Guide for Windows (1996).
Apple Computer, Inc., Newton Programmer'S Guide 2.1 OS Addendum (1997).
Apple Computer, Inc., Newton Programmer'S Reference for Newton 2.0 (1996).
Apple, Computer, Inc., Newton 2.0 User Interface Guidelines (1996).
Apple, Computer, Inc., Newton Backup Utility User'S Guide for the Windows Operating System (1995).
Apple, Computer, Inc., Newton Press User'S Guide for the Macintosh Operating System (1995).
Apple, Inc.'s Supplemental Invalidity Contentions, Case No. 2:08-CV-104-DF-CE, filed Dec. 4, 2009.
Apple's Responsive Markman Brief, Case No. 2:08-CV-00104-DF-CE, Feb. 1, 2010.
Apple's Responses To ZapMedia's First Set of Interrogatories (1-11) and Requests for Production of Documents, Case No. 2:08-CV-I04-DF-CE, Dec. 9, 2008.
Apple's Responses to ZapMedia's Second Set of Interrogatories & Requests for Production of Electronic Documents, Case No. 2:08-CV-I04-DF-CE, Mar. 30, 2009.
Atlanta Business Chronicle, Buyers rejected media appliance, http://www.bizjournals.com/atlanta/stories/2002/09/02/story8.html?t=printable, 1-3, 2002.
Atlanta Business Chronicle, West Coast firm looking at Zapmedia. http://masshightech.bizjournals.com/atlanta/stories/2001/07/16/story7.html?t=printable, 1-3, 2001.
Atlanta Business Chronicle, ZapMedia channels TV, music into one, littp://atlanta.bizjournals.com/atlanta/stories/2000/05/22/focus14.html?t=printable, 1-4, 2000.
Atlanta Business Chronicle, ZapMedia forges alliance with L.A. Internet movie firm, http://atlanta.bizjournals.com/atlanta/stories/2000/08/28/daily.html, 1-2, 2000.
Atlanta Business Chronicle, ZapMedia partners with EarthLink http://atlanta.bizjournals.com/atlanta/stories/2000/12/18/daily11.html?t=printable, 1, 2000.
Atlanta-Business Wire, ZapMedia Teams Up with Amplified and Muze to Deliver Content and Merchandizing Solutions, http://findarticles.com/p/articles/mi_m0EIN/is_2000_August_9/ai_63964068/print, 1-2, 2000.
Audible, Inc., Audible Mobileplayer and Mobileplayer—Plus User's Guide (1997, 1998); and Audible, Inc. S-1 Registration Statement, Apr. 26, 1999.
Bill Whyte, Multimedia Telecommunications, 1-37, and 74-124 (1997).
Charles D. Soule, Computers and Law—Fall 1999, Final Paper (1999).
CNNMoney.com, FORTUNE, This Old Data Warehouse Does a house become a home when you put in a rocking chair and stoke the fire? Maybe in that other millennium. Here in the 21st century, coziness might mean computing at the video-gaming console and rewinding live broadcasts on a super-sharptelevision, http://money.cnn.com/magazines/fortune/fortune_archive/2000/12/01/298207/index.htm, 1-4, 2000.
Complaint for Patent Infringement, Case No. 2:08-CV-I04-DF-CE, Mar. 12, 2008.
Dan Boyarski, A Visual Tour of Andrew: Snapshots of the Andrew System, a campus-wide computing network, a joint venture between IBM and Carnegie Mellon University (Nov. 9, 1989).
David Bainbridge, Craig G. Nevill-Manning, Ian H. Witten, Lloyd A. Smith & Rodger J. McNab, Towards a Digital Library of Popular Music, ACM, at 161-169 (1999).
Defendant Apple, Inc's Answer, Affirmative Defenses, and Counterclaims to Plaintiffs Original Complaint, Case No. 2:08-CV-104-DF-CE, May 8, 2008.
Department of Veterans Affairs, Decentralized Hospital Computer Program, VA FileMan User Manual: Version 21.0, Dec. 1994.
Device profile: ZapMedia ZapStation. http://www.linuxdevices.com/articles/AT4964710304.html, 1-2, 2002.
DVD News: DVDINSIDER: New Groundbreaking Home-Entertainment Convergence Component, http://findarticles.com/p/articles/mi_hb5599/is_200012/ai_n23585888/print, 1, 2000.
E.J. Gomez et al., The BONAPARTE Telemedicine ATM Multimedia Applications, in Multimedia Applications, Services and Techniques—ECMAST '97 621 (Serge Fdida & Michele Morganti eds., May 1997).
Eugene R. Bartlett, Introduction to Cable Television Systems, Cable Television Technology and Operations, McGraw-Hill, Inc., 1-10, 1990.
Fast Company.Com, Amy Wilson, Zap to It, http://www.fastcompany.com/node/40919/print, 1, 2007.
Files From the FBI—Bulletin Boards and Badges: Rusty & Edie's BBS Seized by the FBI, http://textfiles.comlbbs/r&estory.txt (Feb. 9, 2009) (hereafter "BBS—FBI"); and Wikipedia, Rusty n. Edie's BBS, ttp://en.wikipedia.org/wiki/Rusty_n_Edie%27s_BBS (Feb. 9, 2009) (hereafter "BBS—Wikipedia"); and *Playboy Enterprises, Inc.* v. *Russ Hardenburgh, Inc.*, 982 F. Supp. 503 (N.D. Ohio 1997). ("Playboy").
Gerrit Bleumer, Technical Recommendations on Cryptographic Mechanisms for IT and Security Personnel, in Data Security for Health Care, vol. II: Technical Guidelines (The SEISMED Consortium eds., 1996).
Graham M. Campbell & Yih-Chen Wang, Dig-Music: An On Demand Digital Musical Selection System Utilizing CATV Facilities, vol. CE-28, Issue 3, Aug. 1982, xviii-xxvi.
Hancock et al., Software Control of Multimedia Device Interconnection, IP.com Prior Art Database, Sep. 1, 1993, pp. 569-572.
HighBeam Research, 'If You Build It, They Will Hum . . . '. MP3.Com and Zapmedia Team to Create Personalized Multi Access Digi-

(56) References Cited

OTHER PUBLICATIONS tal Music Enfironment, http://www.highbeam.com/DocPrint.aspx?DocId=1GI:66146670, 1-3, 2000.
HighBeam Research, 2001 International CES Draws Impressive List of First-Time Exhibitors. http://www.highbeam.com/DocPrint.aspx?DocId=1GI:68319971, 1-3, 2000.
HighBeam Research, ADVISORY/ANT Limited to Present at Internet Device Builders Show. http://www.highbeam.com/DocPrint.aspx?DocID=1G1:74478998, 1-3, 2001.
HighBeam Research, ADVISORY/Top Industry Executives To Keynote Kagan VOD Summit. http://www.highbeam.com/DocPrint.aspx?DocId-1G1:83526049, 1-5, 2002.
HighBeam Research, ANT Fresco browser enables armchair Internet access via Interisa's digital set-top box; Interisa now shipping 15,000 units a month. http://www.highbeam.com/DocPrint.aspx?DocId=1G1:77031250, 1-3, 2001.
HighBeam Research, ANT Fresco Browser Enables Armchair Internet Access Via Interisa's Digital Set-Top Box; Interisa Now Shipping 15,000 Units a Month. http://www.highbeam.com/DocPrint.aspx?DocId=1G1:77023083, 1-3, 2003.
HighBeam Research, ANT Fresco browser navigates Europe's first satellite-delivered digital entertainment and communications system for hotels; Quadriga Genesis to rival domestic digital broadcasters in look, feeland functionality. http://www.highbeam.com/DocPrint.aspx?DocId=1G1:78262370, 1-3, 2001.
HighBeam Research, ANT Fresco Browser Navigates Europe's First Satellite-Delivered Digital Entertainment and Communications System For Hotels. http://www.highbeam.com/DocPrint.aspx?DocId=1G1:78253377, 1-3, 2001.
HighBeam Research, ANT Fresco Browser Ported to STMicroelectronics' OMEGA Family Reference Design Hardware and STAPI Software; Cost-Effective Product Development Made Quicker and Easier With Demonstration Port., http://www.highbeam.com/DocPrint.aspx?DocId=1G1:70432551, 1-3, 2001.
HighBeam Research, ANT Fresco Browser Selected by Philips Semiconductors for its Nexperia Silicon System Platforms. http://www.highbeam.com/DocPrint.aspx?DocId=1G1:74793847, 1-3, 2001.
HighBeam Research, ANT Fresco Browser to Enable Internet Browsing Capabilities in ZapMedia's ZapStation Hardware Reference Design; To be Showcased at CES 2001 Booth No. 1781., http://www.highbeam.com/DocPrint.aspx?DocId=1G1:668676688, 1-3, 2001.
HighBeam Research, ANT Fresco browser to enable Internet browsing capabilities in ZapMedia's ZapStation hardware reference design., http://www.highbeam.com/DocPrint.aspx?DocId=1G1:68738358, 1-3, 2001.
HighBeam Research, ANT Introduces Industry's first "Content-Driven" Embedded Browser, Providing Optimum Real-World Functionality. http://www.highbeam.com/DocPrint.aspx?DocId=1G1:72949631, 1-3, 2001.
HighBeam Research, ANT Limited Demonstrates Range of Internet Appliances Enabled by Fresco Embedded Browser at Ess, London. http://www.highbeam.com/DocPrint.aspx?DocId=1G1:74566040, 1-3, 2001.
HighBeam Research, ANT Limited Demonstrates Versatility of Its Fresco Browser in Some of the World's Most Innovative Internet Appliances at ESC West 2001. http://www.highbeam.com/DocPrint.aspx?DocId=1G1:72949627, 1-4, 2001.
HighBeam Research, ANT Limited Expands to New Global HQ in Cambridge UK; Plans to Double its Software Engineering Capability in Six Months. http://www.highbeam.com/DocPrint.aspx?DocId=1G1:75343259, 1-2, 2001.
HighBeam Research, ANT Limited Harnesses Power of the Internet for OpenGlobe's New Breed of Multi-Media Home Entertainment Appliances. http://www.highbeam.com/DocPrint.aspx?DocId=1G1:72949630, 1-3, 2001.
HighBeam Research, ANT Limited harnesses power of the Internet for OpenGlobe's new breed of multi-media home entertainment appliances; ANT's Fresco enables browsing capabilities for digital home entertainment devices jointly designed by OpenGlobe and major consumer electronic OEMs. http://www.highbeam.com/DocPrint.aspx?DocId=1G1:72989766, 1-3, 2001.
HighBeam Research, ANT Limited Officially Opens Its New Global HQ in Cambridge, U.K.; Facility to Accommodate Next Phase of company's Rapid Expansion. http://www.highbeam.com/DocPrint.aspx?DocId=1G1:76405210, 1-2, 2001.
HighBeam Research, ANT Limited to demonstrate its industry leading technology for interactive TV and multimedia broadcasting at IBC; Showcasing products from Quiero TV, Pace Micro Technology, Alba, IBM, Sagem, Interisa, LSI Logic, Wind River Systems and Amino Communications. http://www.highbeam.com/DocPrint.aspx?DocId=1G1:77622806, 1-3, 2001.
HighBeam Research, ANT Ltd. to Demonstrate Its Industry-Leading Technology for Interactive TV and Multimedia Broadcasting at IBC. http://www.highbeam.com/DocPrint.aspx?DocId=1G1:77601401, 1-3, 2001.
HighBeam Research, Building a Business on Betty Boop. http://www.highbeam.com/DocPrintaspx?DocID=1G1:76995271, 1-3, 2001.
HighBeam Research, Cable Timeshifting—Opportunities in a Interactive TV World., http://www.highbeam.com/DocPrint.aspx?DocId=1G1:68738800, 1-3, 2000.
HighBeam Research, CES '02 focuses on convergence http://www.highbeam.com/DocPrint.aspx?DocId=1P2:13115264, 1-2, 2002.
HighBeam Research, Convergent Component.(DMC 100 Digital Media Center)(Brief Article)(Product Announcement). http://www.highbeam.com/DocPrint.aspx?DocId=1G1:79148704, 1, 2001.
HighBeam Research, Customized Audio/Video Jukebox Brings New Meaning to Home Entertainment. http://www.highbeam.com/DocPrint.aspx?DocId=1G1:80107324, 1-2, 2001.
HighBeam Research, Datacasting hits NATPE.(All systems go for iBlast, SpectraRep; queries linger for Geocast)(National Association of Television Program Executives)(Brief Article), http://www.highbeam.com/DocPrint.aspx?DocId=1G1:69977794, 1-2, 2001.
HighBeam Research, Digital Creations Partners with ZapMedia to Develop Content Management System., http://www.highbeam.com/DocPrint.aspx?DocId=1G1:61967873, 1-2, 2000.
HighBeam Research, Digital making waves at electronics show Newest devices take center stage in Las Vegas. http://www.highbeam.com/DocPrint.aspx?DocId=1P2:1433895, 1-2, 2002.
HighBeam Research, DVDINSIDER: InterVideo Introduces New DVD Player/Decoder Designed for Windows CE, http://www.highbeam.com/DocPrint.aspx?DocId=1P1:80490065, 1-2, 2000.
HighBeam Research, DVDINSIDER: MCY Licensees Array of Premium Music Events, http://www.highbeam.com/DocPrint.aspx?DocId=1P1:80490092, 1, 2000.
HighBeam Research, DVDINSIDER: New Groundbreaking Home-Entertainment Convergence Component, http://www.highbeam.com/DocPrint.aspx?DocId=1P1:80490089, 1, 2000.
HighBeam Research, Echelon Showcases Home Networking Technology at Excite@Home's Broadband LIVE! Event. http://www.highbeam.comDocPrint.aspx?DocId=1G1:74508383, 1-2, 2001.
HighBeam Research, Excite@Home and Industry Leaders Introduce Broadband LIVE!—A Unique Consumer Broadband Showcase. http://www.highbeam.com/DocPrint.aspx?DocId=1G1:74445907, 1-2, 2001.
HighBeam Research, Excite@Home Lives the Broadband Lifestyle. (Brief Article). http://www.highbeam.com/DocPrint.aspx?DocId=1G1:75101455, 1-2, 2001.
HighBeam Research, Harman Kardon Announces Alliance With ZapMedia to Market New Home-Entertainment Convergence Component, http://www.highbeam.com/DocPrint.aspx?DocId=1G1:68271778, 1-3, 2000.
HighBeam Research, Innovations, http://www.highbeamcom/DocPrint.aspx?DocId=1P1:38798299, 1-5, 2000.
HighBeam Research, Interactive TV & Hard Disc Drives: TV Morphs Into Media Center.(Brief Article)(Product Announcement) http://www.highbeam.com/DocPrint.aspx?DocId=1G1:71704304, 1-3, 2001.
HighBeam Research, InterVideo Unveils DVD Player/Decoder for Windows CE Devices. http://www.highbeam.com/DocPrint.aspx?DocId=1G1:66622960, 1-2, 2000.

(56) References Cited

OTHER PUBLICATIONS

HighBeam Research, InterVideo's LinDVD Selected for ZapStation Universal Media Player Technology Powers DVD Playback in Breakthrough Digital Media Appliance., http://www.highbeam.com/DocPrint.aspx?DocId=1G1:6631845, 1-3, 2000.
HighBeam Research, It's Put Up or Shut Up for ZapMedia. http://www.highbeam.com/DocPrint.aspx?DocId=161:81602197, 1-2, 2002.
HighBeam Research, Jackpot in Vegas. http://www.highbeam.com/DocPrint.aspx?DocId=1G1:72275279, 1-5, 2001.
HighBeam Research, Journey to the center of it all. http://www.highbeam.com/DocPrint.aspx?DocId=1P2:13124350, 1-3, 2002.
HighBeam Research, Journey to the center of it all. (Always on). (development of digital video records)(Brief Article) http://www.highbeam.com/DocPrint.aspx?DocId=1G1.83915664, 1-3, 2002.
HighBeam Research, Kelly's 1: Keeping You Up to Speed on the Net'.(Features), http://www.highbeam.com/DocPrint.aspx?DocId=1G1:65266879, 1-2, 2000.
HighBeam Research, Max Broadcasting Network and OmniSky Deliver Real Time NFL and MLB Content to Wireless—Mobile—Users., http://www.highbeam.com/DocPrint.aspx?DocId=1G1:67679585, 1-3, 2000.
HighBeam Research, MAX Broadcasting Network and ZapMedia form alliance., http://www.highbeam.com/DocPrint.aspx?DocId=1G1:65376146, 1-3, 2000.
HighBeam Research, MAX Broadcasting network to provide sports content to ZapMedia and AvantGo.(Company Business and Marketing)(Brief Article), http://www.highbeam.com/DocPrint.aspx?DocId=1G1:65465098, 1, 2000.
HighBeam Research, MAX Broadcasting to provide personalized content to handheld devices through AvantGo. http://www.highbeam.com/DocPrint.aspx?DocId=1G1:65376127, 1-2, 2000.
HighBeam Research, MCY Licenses Array of Premium Music Events, http://www.highbeam.com/DocPrint.aspx?DocId=1G1:68143283, 1-2, 2000.
HighBeam Research, MediaX Corporation Receives Strategic Investment From CTI II Limited. http://www.highbeam.com/DocPrint.aspx?DocId=1G1:70347014, 1-2, 2001.
HighBeam Research, MediaX Finishes Development of 'MIP3' Proprietary Software Technology, Allows Complex Web Site Customization, Rating System and Content Management., http://www.highbeam.com/DocPrint.aspx?DocId=1G1:70712819, 1-3, 2001.
HighBeam Research, MediaX Sets Date for Launch of amuZnet 3.0, Provides Unprecedented User Customization & Comprehensive Market Research. http://www.highbeam.com/DocPrint.aspx?DocId=1G1:72773352, 1-3, 2001.
HighBeam Research, MediaX's amuZnet Streams Exclusive 2000 Billboard Music Awards Video Footage, Presents Multitude of Celebrity Red Carpet Interviews, http://www.highbeam.com/DocPrint.aspx?DocId=1G1:67702099, 1-2, 2000.
HighBeam Research, MediaX's amuZnet.com Hosts Live Audio Chat With NSYNC's Chris Kirkpatrick To Discuss New FuMan Skeeto Clothing Lines and Exclusive contest; Fashion Show on the Net to Follow. http://www.highbeam.com/DocPrint.aspx?DocId=1G1:70425066, 1-3, 2001.
HighBeam Research, MediaX's www.amuZnet.com Reaches 1.3 Million Registered Users, Company Prepares to Unveil amuZnet 3.0, Breaks New Ground in Web Site Customization. http://www.highbeam.com/DocPrint.aspx?DocId=1G1:70920221, 1-2, 2001.
HighBeam Research, New brands, 2nd-gen devices enter Web audio component biz. http://www.highbeam.com/DocPrint.aspx?DocId=1P2:13141125, 1-4, 2002.
HighBeam Research, New Software Development Manager to Oversee ANT's Engineering Team Expansion. http://www.highbeam.com/DocPrint.aspx?DocId=1G1:76129357, 1-2, 2001.
HighBeam Research, No Shortage of Options. http://www.highbeam.com/DocPrint.aspx?DocId=1G1:71704310, 1-3, 2001.
HighBeam Research, Quantum Corporation Helps Personalize Satellite TV—Ships Hard Drives for New DIRECTV Receiver With TiVo Service., http://www.highbeam.com/DocPrint.aspx?DocId=1G1:66573442, 1-3, 2000.
HighBeam Research, Quantum QuickView Audio/Video Technology Propels Delivery Platform for Zapmedia.com/Gannet Co. Inc./USA Today Venture., http://www.highbeam.com/DocPrint.aspx?DocId=1G1:61872166, 1-3, 2000.
HighBeam Research, Quiero TV Chooses ANT's Internet Software to Lead the Success of its Interactive TV Service in Spain; ANT Enables Browsing and Email in Over 200,000 Spanish Homes. http://www.highbeam.com/DocPrint.aspx?DocId=1G1:72619407, 1-3, 2001.
HighBeam Research, Radio Free Virgin and ZapMedia Announce Strategic Partnership to Broadcast Radio Free Virgin Music Programming Beyond the PC. http://www.highbeam.com/DocPrint.aspx?DocId=1G1:73574127, 1-2, 2001.
HighBeam Research, Really Big Film Corp Retains MediaX to Spearhead Online Marketing Campaign for Giant-Screen Concert Film 'NSYNC Bigger Than Live'. http//www.highbeam.com/DocPrint.aspx?DocId=1G1:72669653, 1-3, 2001.
HighBeam Research, Spring Audio: Capitalizing on the Web.(new Internet-based products). http://www.highbeam.com/DocPrint.aspx?DocId=1G1:75706092, 1-3, 2001.
HighBeam Research, Stereophile Guide Delivers the Word on InterVideo. http://www.highbeam.com/DocPrint.aspx?DocId=1G1:70354626, 1-2, 2001.
HighBeam Research, Surveying the Soundscape.(products at the 2001 Consumer Electronics Show) http://www.highbeam.com/DocPrint.aspx?DocId=1G1:76996341, 1-6, 2001.
HighBeam Research, Talk about convergence.(Brief Article),http://www.highbeam.com/DocPrint.aspx?DocId=1G1:64258801, 1, 2000.
HighBeam Research, The Atlanta Journal and Constitution Technology Briefs. http://www.highbeam.com/DocPrint.aspx?DocId=1G1:78846924, 1-2, 2001.
HighBeam Research, This Year's Model.(content is hot topic at NATPE conference), http://www.highbeam.com/DocPrint.aspx?DocId=1G1:68914073, 1-4, 2000.
HighBeam Research, Try a New Internet-Enabled Box http://www.highbeam.com/DocPrint.aspx?Doc=1P1:49353006, 1-2, 2002.
HighBeam Research, TV online. A look at how the top station groups are developing their Internet plans, http://www.highbeam.com/DocPrint.aspx?DocId=1G1:6504403, 1-7, 2000.
HighBeam Research, Two deals for Alwaysi.com., http://www.highbeam.com/DocPrint.aspx?DocId=1G1:68650377, 1, 2000.
HighBeam Research, VC Market Shows Faith in ANT to Sum of $3.6 Million; Total Investment in ANT to Date Now $11.9 Million. http://www.highbeam.com/DocPrint.aspx?DocId=1G1:76838076, 1-2, 2001.
HighBeam Research, Want to Win the War? Show You Care. http://www.highbeam.com/DocPrint.aspx?DocId=1G1:70737116, 1-4, 2001.
HighBeam Research, Web films could press cable VOD in future. (Broadband Content). http://www.highbeam.com/DocPrint.aspx?DocId=1G1:80191602, 12, 2001.
HighBeam Research, Web Legal and Business Executive Joins Hot New Atlanta Dot.Com., http://www.highbeam.com/DocPrint.aspx?DocId=1G1:59083669, 1-3, 2000.
HighBeam Research, ZapMedia and EarthLink Sign Broadband Marketing and Distribution Agreement; EarthLink to Become ZapMedia's First Broadband Connectivity Partner.,http://www.highbeam.com/DocPrint.aspx?DocId=1G1:68270131, 1-2, 2000.
HighBeam Research, ZapMedia and Max Broadcasting Team-up to Provide On-demand Sports Entertainment., http://www.highbeam.com/DocPrint.aspx?DocId=1G1:65270217, 1-2, 2000.
HighBeam Research, ZapMedia and Microsoft Team To Provide Windows media Support on Breakthrough ZapStation Digital Entertainment Appliance., http://www.highbeam.com/DocPrint.aspx?DocId=1G1:65320145, 1-3, 2000.
HighBeam Research, ZapMedia Announces Alliance With MediaX for Multimedia Content., http://www.highbeam.com/DocPrint.aspx?DocId=1G1:66089994, 1-3, 2000.

(56) References Cited

OTHER PUBLICATIONS

HighBeam Research, ZapMedia Announces Content Alliance with MovieFlix.com., http://www.highbeam.com/DocPrint.aspx?DocId=1G1:64774037, 1-3, 2000.
HighBeam Research, ZapMedia Closes Additional Round of Funding. http://www.highbeam.com/DocPrint.aspx?DocId=1G1:81395544, 1-2, 2002.
HighBeam Research, ZapMedia partners with EarthLink—Atlanta Business Chronicle: http://www.highbeam.com/DocPrint.aspx?DocId=1G1:1202030001433101, 1, 2000.
HighBeam Research, ZapMedia Teams Up with Amplified and Muze to Deliver Content and Merchandizing Solutions, http://www.highbeam.com/DocPrint.aspx?DocId=1G1:63964068, 1-3, 2000.
HighBeam Research, ZapMedia(TM), Inc. and Harman Kardon(R), Inc. Announce Agreement to manufacture and Market New Entertainment Convergence Component., http://www.highbeam.com/DocPrint.aspx?DocId=1G1:68270130, 1-3, 2000.
HighBeam Research, ZapMedia, Inc. and Samsung Electro-Mechanics Form Strategic Relationship. http://www.highbeam.com/DocPrint.aspx?DocId=1G1:70713970, 1-2, 2001.
HighBeam Research, ZapMedia.com Selects Quantum QuickView Audio/Video Storage Technology for Next-Generation Home Entertainment System, http://www.highbeam.com/DocPrint.aspx?DocId=1G1:61396356, 1-3, 2000.
iApplianceweb-OEG, Susan Hospod, ZapStation, http://www.iapplianceweb.com/appreview/audio_players_24.htm, 1-2.
ISP Business: ZapMedia and EarthLink Sign Broadband Marketing and Distribution Agreement-Internet/Web/Online Service Information—Brief Article, http://findarticles.com/p/articles/mi_m0IGP/is_2_4/ai_80057825/print 1, 2001.
J.N. Slater, Cable Television Technology, 30-39, 130-140, and 158-169 (Ellis Horwood 1989) (1988).
Jack Lacy, James H. Snyder & David P. Maher, Music on the Internet and the Intellectual Property Protection Problem, Proceedings of the IEEE International Symposium on Industrial Electronics, vol. 1, SS77-SS83 (1997).
James H. Morris et al., Andrew: A Distributed Personal Computing Environment, in Communication of the ACM, vol. 29 No. 3 (Mar. 1986).
Jan Gecsei, The Architecture of Videotex Systems (1983).
Jon W. Dunn & Constance A. Mayer, Variations: A Digital Music Library System at Indiana University, Proceedings of the Fourth ACM Conference on Digital Libraries, 12-19 (1999).
L. Aguilar, J.J. Garcia-Luna-Aceves, D. Moran, E.J. Craighill & R. Brungardt, Architecture For A Multimedia Teleconferencing System, ACM, 126-136 (1986).
Laura Challman Anderson & Jeffrey B. Lotspiech, Rights Management and Security in the Electronic Library, Bulletin of the American Society for Information Science, Oct./Nov. 1995, at 21-23.
Los Angeles & Atlanta—(Business Wire) ANT Fresco Browser to Enable Internet Browsing Capabilities in ZapMedia's ZapStation Hardware Reference Design; To be Showcased at CES 2001 Booth No. 1781; http://findarticles.com/p/articles/mi_m0EIN/is_2001_Jan_3/ai_68676688/print, 1-2, 2001.
Mark Stefik, Letting Loose the Light: Igniting Commerce in Electronic Publication in Internet Dreams: Archetypes, Myths, and Metaphors (The MIT Press 1996).
MDIS Technical Development Team, US Army Engineering Division; Medical Diagnostic Imaging Support System Draft Performance Work Statement, Version 0.9 ifc; Mar. 28, 1990.

Michael McCandless, Content distribution on the Web, IEEE Expert, vol. 11, Issue 5, 8-9 (1996).
Michael McCandless, The MP3 revolution, IEEE Intelligent Systems, vol. 14, Issue 3, 8-9 (1999).
Michael Robertson and Ron Simpson, The Official MP3.Com Guide to MP3 (Sybil Sosin, ed. 1999).
Nathan J. Muller, Improving and Managing Multimedia Performance Over TCP/IP Nets, International Journal of Network Management, vol. 8, 356-367 (1998).
Orion Hodson, Socrates Varakliotis, & Vicky Hardman, A Software Platform for Multiway Audio Distribution Over The Internet, IEE Colloquium on Audio and Music Technology: The Challenge of Creative DSP (1998).
P.W. Bagenal & S.M. Upton, Customer Management And The Eurocypher Conditional Access System At British Satellite Broadcasting, International Broadcasting Convention, Sep. 21-25, 1990 at 270-277.
Patrick R. Parsons & Robert M. Frieden, The Cable and Satellite Television Industries, 1-18, 68-114, and 157-203 (1998).
Plaintiffs Reply to Defendant's Counterclaims, Case No. 2:08-CV-I04-DF-CE, May 20, 2008.
Ruth E. Dayhoff & Eliot L. Siegel, Digital Imaging Within and Among Medical Facilities, in Computerizing Large Integra Ted Health Networks 473 (Robert M. Kolodner ed. 1997).
S. Merrill Weiss, Issues in Advanced Television Technology, vii-xv, 1996.
Sharon Carmen Chavez Mobley, Moving to Clinical Workstations, in Computerizing Large Integrated Health Networks 473 (Robert M. Kolodner ed. 1997).
Slashdot, ZapStation Cd/MP3/DVD Player/Server, http://hardware.slashdot.org/article.pl?no_d2=1&sid=00/09/22/2223221, 1-4, 2000.
Stefano Antoniazzi & Gottfried Schapeler, An Open Software Architecture for Multimedia Consumer Terminals, in Multimedia Applications, Services and Techniques—ECMAST '97 621 (Serge Fdida & Michele Morganti eds., May 1997).
Steve Davis, CompuServe Complete Handbook & Membership Kit (1998).
The Roots of Storage and Transmission, 44-51, First Published Nov. 1994. No. 24 in the series.
Tim Berners-Lee, Information Management: A Proposal, CERN, 1-21 (1989).
Tim O'Reilly, et al., Windows 98 in a Nutshell—A Desktop Quick Reference (1999).
Using subtitles and alternative audio tracks, To use subtitles and alternative audio tracks: while you're playing a movie in iTunes, choose Controls > Audio & Subtitles > [Option]. file:///Users/lissy/Documents/**Work/iTunes/iT%207.6/iTunesHelp-81.1...es.app/Contents/Resources/English.lproj/iTunes%20Help/pgs/20868.html.
ZAP Media Tools US, ZapSolution, http://www.zapsolution.com/zmtus.htm 1-3.
*ZapMedia Serivces, Inc.* v. *Apple Inc.*, Plaintiff's Claim Construction Reply Brief, Civil Action No. 2:08-CV-104-DF-CE, dated Feb. 16, 2009.
ZapMedia Services, Inc.'s Responses to Apple, Inc.'s First Set of Interrogatories, Case No. 2:08-CV-I04-DF-CE, Dec. 5, 2008.
ZapMedia ZapStation/Harman Kardon DMC 100, http://www.linuxjournal.com/article/4526, 1-3, 2001.
ZapMedia's Opening Claim Construction Brief, Case No. 2:08-cv-104-DF-CE, Dec. 23, 2009.
Hancock, et al., Software Control of Multimedia Device Interconnection, ip.com, p. 569-572, Mar. 20, 2005.

\* cited by examiner

DEVICE ASSOCIATED WITH A USER ACCOUNT

CROSS-REFERENCE TO RELATED APPLICATIONS

This application is a divisional of U.S. patent application Ser. No. 11,162,716 filed on Sep. 20, 2005 now U.S. Pat. No. 7,343,414, which is a continuation of U.S. patent application Ser. No. 09/679,688 filed Oct. 5, 2000 issued as U.S. Pat. No. 7,020,704 on Mar. 28, 2006, which claims the benefit of the priority of US. Provisional Patent Application Nos. 60/157,736 filed Oct. 5, 1999; 60/176,833 filed Jan. 19, 2000; 60/177,063 filed Jan. 19, 2000; 60/177,783 filed Jan. 24, 2000; 60/177,884 filed Jan. 24, 2000; 60/176,830 filed Jan. 19, 2000; 60/176,829 filed Jan. 19, 2000; and 60/177,867 filed Jan. 24, 2000. The entirety of each of these non-provisional and provisional applications is incorporated herein by reference.

BACKGROUND OF THE INVENTION

The distribution of music, video, software and other media assets has been dramatically transformed by the digital age and the Internet. For example, distribution of music is evolving from a physical copy sold by retail stores, catalog companies or on-line vendors, to digital copies transmitted over the Internet. In this connected and digital world, a system and method are needed whereby users can use media assets from multiple devices without the need to carry the asset on a memory device. It is desirable to provide a system and method that allows for the portability of media assets across different devices that are capable of connecting to a source of the media assets directly or indirectly over one or more communications networks.

BRIEF SUMMARY OF THE INVENTION

Briefly, the present invention is directed to a system and method for distributing digital media assets to a plurality of users. A portal is provided comprising at least one server computer. The portal executes a media library database server application that manages access to a master library of media assets that can be accessed by users via one or more communication networks. Each of a plurality of media player devices communicates with the portal to access media assets for use. Each media player device assists in managing media assets licensed for use by a user. The present invention is more fully described in the following description taken in conjunction with the accompanying drawings.

DETAILED DESCRIPTION OF THE INVENTION

Figure 1:
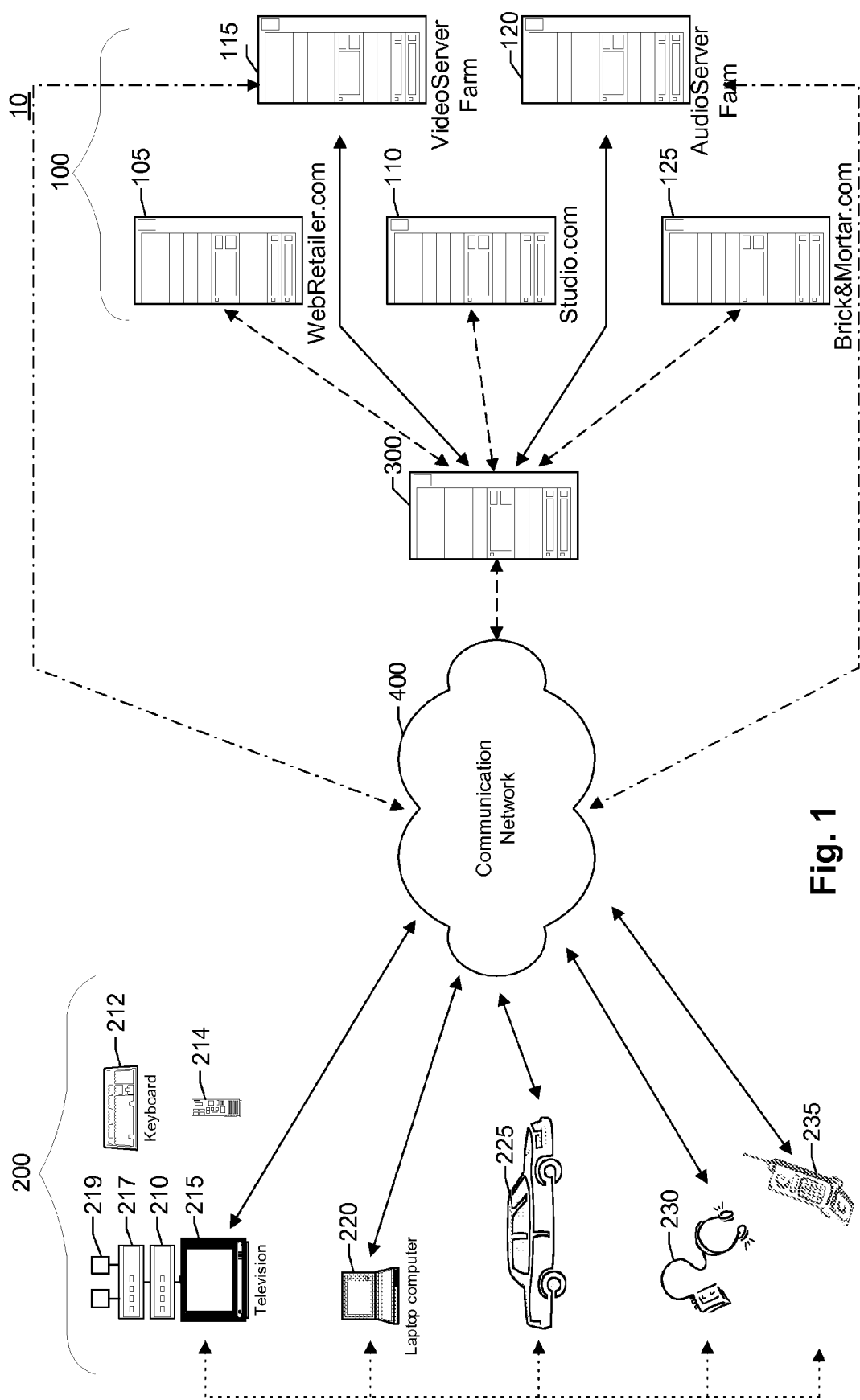
FIG. 1 is an overall block diagram of the system according to the present invention.
Figure 2:
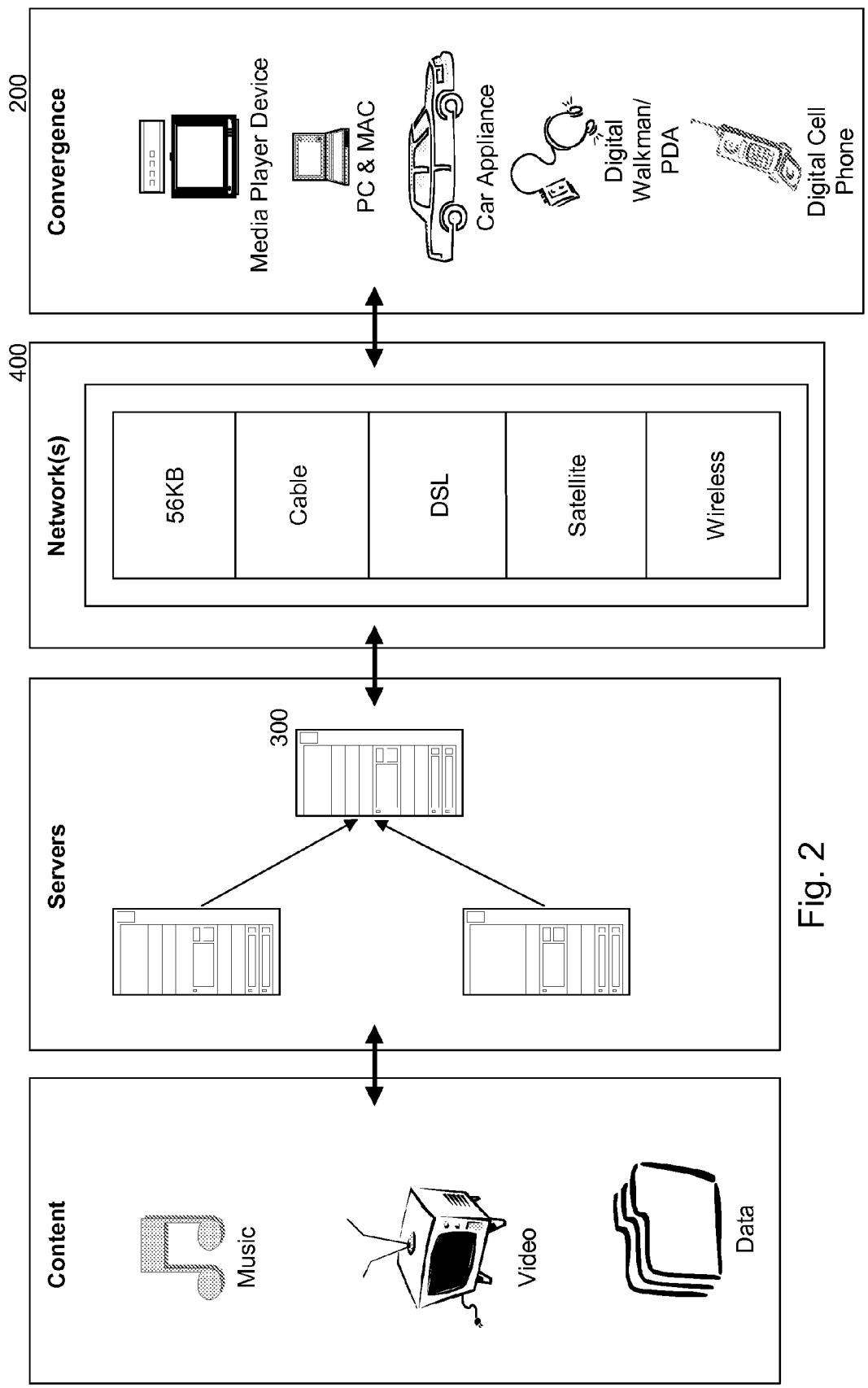
FIG. 2 is a block diagram depicting the flow of media asset data according to the present invention.

Referring to FIGS. 1 and 2, the present invention is directed to a system 10 for distributing digital media assets from a variety of media sources 100 to a variety of media player devices 200 through a portal 300. Examples of media sources 100 are a webretailer 105, a music or video production or distribution studio 110, a video server 115 containing a library of video assets such as movies and other video productions from one or more production companies, an audio server 120 containing a library of audio assets such as music and other audio productions from one or more record companies and a web site 125 for an online and/or brick&mortar media asset company. In addition, artists not affiliated with a mainstream production company may make their video and/or audio assets available from a host server or their own servers. The portal 300 connects to the media asset sources 100 by any suitable means, such as the Internet, dedicated telecommunication lines, wireless networks, dedicated wide area networks, or any combination thereof. The terminology "electronically transmitting" a digital media asset is meant to include wired and/or fiber communication, wireless communication, and any long-distance or short range communications (IEEE 802.11, HomeRF, BlueTooth™) or combinations thereof. In addition to downloading or streaming media assets stored locally to the portal 300, the portal 300 connects to media asset sources 100 and downloads and/or streams media assets from those sources to media player devices 200.

A media player device 200 is a device that enables a user to play a digital media asset. The media player device 200 may be a home consumer device 210 that connects to a television or other monitor 215 as well as a home stereo 217 (amplifier/tuner, etc.) 20 which in turn is connected to speakers 219, a personal computer (PC) 220 (laptop or desktop), a vehicle-based electronic device 225, a portable media player device 230, or a wireless electronic device 235. The media player is also referred to as a client media player insofar as it acts as a client to the portal 300 in some circumstances. An example of still another type of media player is a cable set-top box.

Briefly, a media player device 200 comprises a processor that executes a media playback software application program (or alternatively hardware) to enable a user to play or use a digital media asset, such as music, video, games, etc. In addition, the media player device 200 may have a display (LCD or other type), speakers, microphone, etc. The media playback software application program may be a platform generic software program that is useful on a diverse variety of media player devices. The media player device 200 of the home consumer device 210 variety may resemble a consumer electronics DVD player, that also connects to the Internet via broadband and/or modem. A broadband connection affords the ability of the media player device 200 to download audio and video media assets at desirable rates. The user interface with the home consumer device 210 is by way of a wired or (infrared or RF) wireless keyboard 212 and/or a handheld (infrared or RF) wireless remote 214. The details of one example of a media player device 200 are described hereinafter in conjunction with FIGS. 5-7.

A user may have multiple media player devices 200 and therefore desire access to media assets that he/she has purchased the rights to, on each media player, if that user has purchased rights of sufficient scope to permit access on multiple media players. Those assets to which a user has purchased digital access rights on one or more media players are hereinafter referred to as a user's licensed assets. Moreover, multiple users within a "family" may have different levels of access to certain classes of media assets on one or more media players 200 in that user family. Each user within the user family would have his/her own identifier and password. For example, an adult user might have access to certain "R" rated videos, while a child user might have access to only "G" rated videos. Some media assets may be licensed royalty free to a user such that there is no need to track how a user uses that particular media asset. The portal 300 is a computer server or group of servers that functions to allow for the storage, stream and download of media assets to a media player 200. In addition, as described above the portal 300 provides connections to other source sites, such as sources of streaming Internet radio providers.

The portal 300 allows for synchronization and replication of a user's licensed assets with each of the user's media player devices 200. This functionality is hereinafter referred to as the virtual media asset library. The portal 300 also serves as a central repository within which media assets are "tagged" with identity and access privileges of those users (and users within a user family) that have licensed rights in the media assets. The portal 300 may be accessible directly from a media player device and through one or more web sites and may provide a customizable interface or view to each user, if desired. The virtual media asset library technology may include rights management, watermarking, encryption and containment functions performed by the portal 300.

The digital media assets distributed by the system 10 may be audio such as music, video such as movies, television programs or other video productions, interactive software games, or any media that is digitized and suitable for electronic distribution. The digital media asset may be protected, where applicable or necessary, from piracy by the use of various methods, including digital rights asset management (DRM), encryption and watermarking. The digital media assets may be in any known or hereinafter developed formats, such as, for example, MP3, EPAC, WAV, REAL, MPEG, QuickTime and other formats.

The Portal

The portal 300 communicates with media player devices 200 via communication network 400 that may consist of the Internet and/or a combination of wireless communication networks, such as cellular networks, PCS networks, etc. While a single portal 300 is shown in FIG. 1, it should be understood that there may be multiple portals, each dedicated to serve subsets of media player devices in a distributed fashion so as to minimize load on individual servers.

Figure 3:
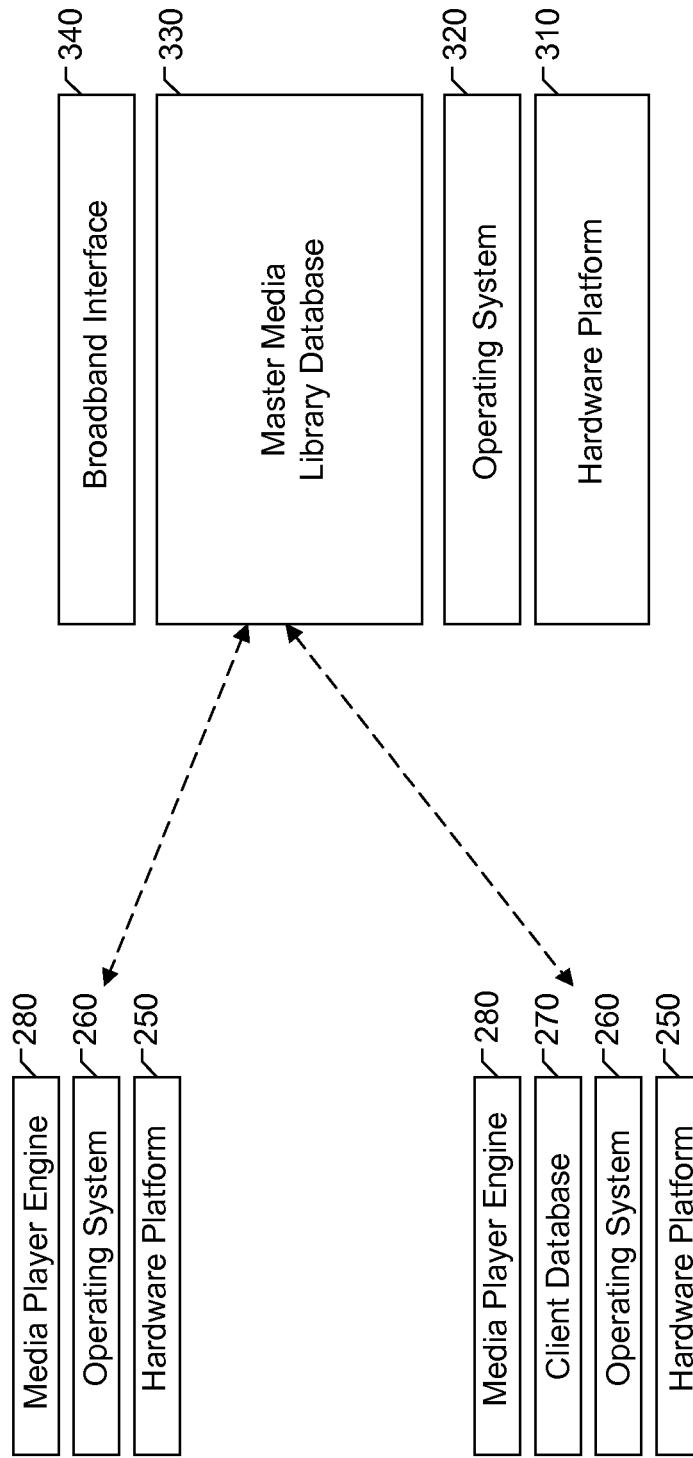
FIG. 3 is a block diagram depicting the interaction of various software components in the system.
Figure 4:
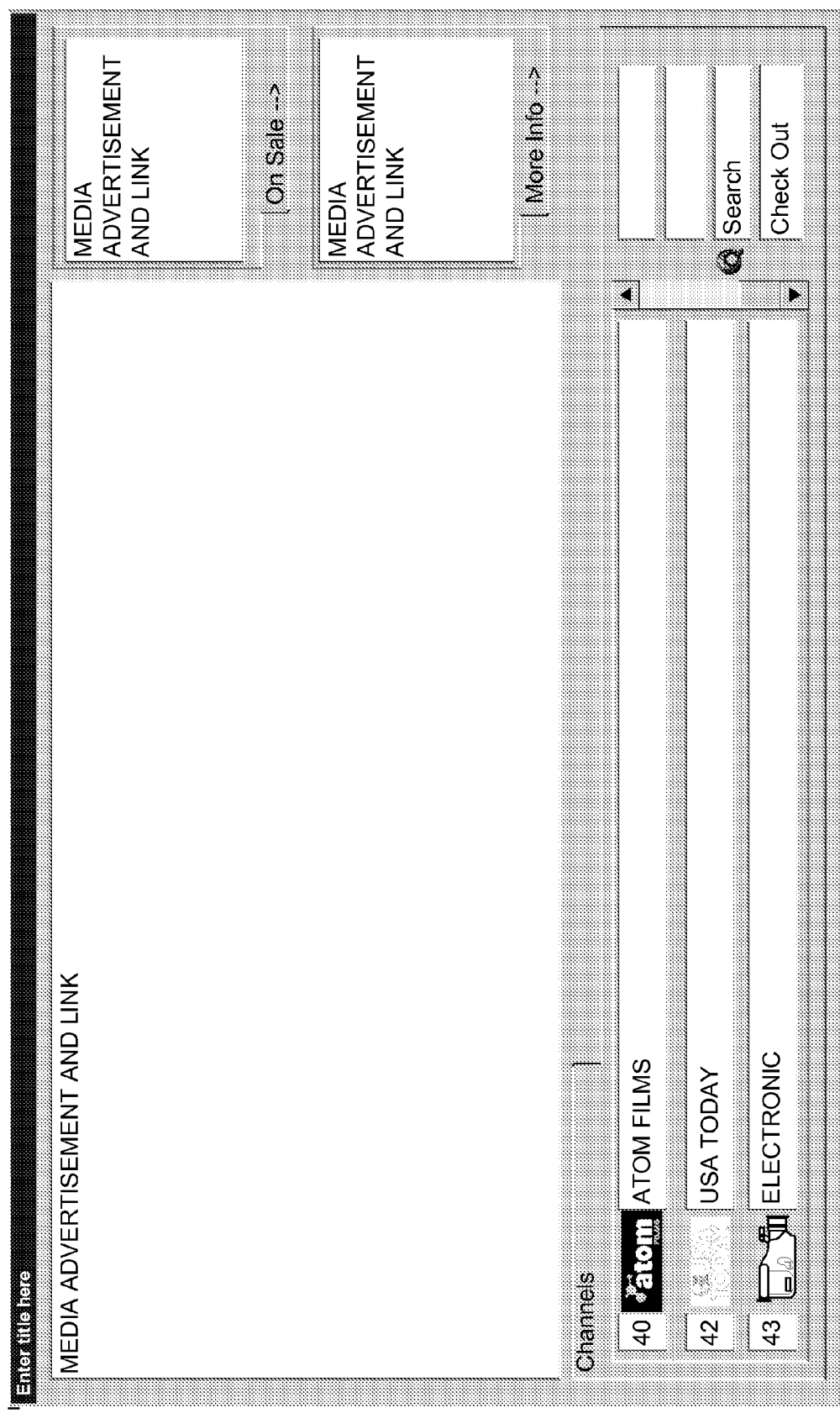
FIG. 4 is an example of a main screen or home page for the portal.

With reference to FIG. 3, a basic architecture for the portal 300 is described. The components of the portal 300 are a hardware platform 310, such as one or more computer servers, an operating system 320 that is executed by the hardware platform 310, a master media library database (server) application 330 and a broadband interface 340. An example of a web site home page through which a user interacts with the portal 300 is shown in FIG. 4. In this exemplary screen, there are several areas for advertisements, one or more of which are "hot" and thus provide a link to an advertiser site. In addition, there are channels on the bottom portion of the screen associated with various media sources.

In accordance with one aspect of the invention, the master media library database application 330 synchronizes the licensed digital media assets for a user with the client database application in each media player of the user so that a user can access any licensed media asset from any of the user's media players for which that user has licensed rights. Alternatively, for media players that do not have a database client application, the master database application 330 maintains the user's database of assets "on-line" and a user obtains access to it by connecting to the portal 300. This process is explained further hereinafter.

There are numerous other functions performed by the portal 300 and these are described below.

Update User and Billing Information

To begin with, the portal manages user information, such as name, address and phone information, billing and price plans and billing views desired by a user. There may be a monthly subscription charge and additional charges for the media assets a user desires to use.

Subscription Management Preferences

This portal allows the user to create their own custom portal view which previews and presents content that might fit the user's infotainment profile. Examples of these preferences are types of movies, producer, director, cinemaphotographer, choreographer, actor/actress, music type, musician or artist, etc.

Content Management

Some or all of the user's licensed assets are catalogued and stored by the master media library database in the portal 300. (It should be understood that the media player device itself has storage capability to locally store assets.) There are numerous features associated with this aspect of the system. The portal 300 may be used to add, edit, or delete a user in an account. It may be used to create, edit, or delete a playlist of assets, as well as add or delete particular audio or video assets.

The portal may be used to edit the metadata associated with an asset (e.g., edit the title, artist genre classification of a song or the title, actor's name or director of a movie).

Asset Acquisition

There are a variety of functions and capabilities provided by the system associated with the process of acquiring assets, such as those listed below.

Stream Asset
Download Asset
Find/Search Master Database
Get Usage History
Set Access Privileges—time, date, type, rating, number, etc.
Check account status—active, limited, etc.
Log activity—detailed request database
Log Errors per user
Log Errors per title
Royalty Management Artists and media asset sources/distributors can interface to the portal to review usage activity of their respective media assets, including information such as, total downloads, downloads by type, downloads by region, and downloads by country. Royalties are calculated automatically and the billing system is queued for automatic payment, with specific approval being an option.

Interactive Services
Email:
Send & Receive Email
Third-Party hosting
Standard POP3 Compliant Chat
  Provide Chat rooms for various topic discussions
  Provide Chat Café with background music
  Allow for password protection
Web Browsing
  Hot-link to other sites from portal
  Track URL paths for insertion into database— (i.e. —link a song)
  Browser may be tailored for TV and control by wireless keyboard and/or mouse
News Groups
  Allow for the creation of vertical news groups
  Allow for interactive input
Games
  Provide for on-line gaming
  Third-party pass-through
  Data Warehouse Interface/Reporting The portal may interface to third party databases for access to media assets. In this case, the portal replicates aspects of the remote databases. These media assets are locally cached by the portal for most commonly requested assets. In addition, the portal generates essential usage reports.

Advertisement Server

The portal includes advertisement server software functionality to allow for third-party advertisement submission, deletion and maintenance. The portal automatically inserts an ad into download stream, and selects an advertisement based on user profile information when allowable. Advertisement usage and user profile information is continuously tracked. The portal generates detailed usage reports for the operator of the system as well as for the advertiser. The advertisements may include URL "hotlinks" within an advertisement window, as is well known in the art. In addition, the portal allows for personalized/customized advertisement generation.

Personalization Engine

The portal further includes personalization software that provides personalized views for users. This further allows for insertion of targeted advertising based on profiles. An example of a type of profile that is created and tracked is a user's "psychographic" profile. Suggestions are generated for users based on viewing and listening profile information.

Activity Analysis

The portal monitors activity and usage of the system to suggest patterns for load management.

The Media Player Device

Referring again to FIG. 3, one form of the media player device 200 comprises a hardware platform 250, an operating system 260, a database client application 270 and a media player engine software application 280. The media player engine 280 is, for example, based on a software platform that is useful across multiple and diverse types of hardware platforms of media player device, such as Java, or is written as a platform specific application. The media player engine 280 may include interfaces to third party software for certain functions and features. The media library database server application 330 and the database client application 270 are, for example, database software products licensed by Oracle Corp. Briefly, the media player engine 280 comprises software, such as Java and C++ code for playing back audio and video assets on an operating system platform 260. The operating system 260 may be Windows, Macintosh, Linux or other operating platforms, which may include Internet browser capability or interfaces to a resident Internet browser application. Some or all of the media player engine 280 may be based on a platform portability software, such as Java.

Another form of a media player device is also shown in FIG. 3, wherein the media player device does not include a client database application 270. Instead, the master media library database 330 of the portal maintains an "on-line" database of assets to which the user of that media player device is entitled to use. The user is informed of those assets in this on-line database when the media player device connects to the portal. The functionality of the media player device without the client database application 270 is otherwise similar to a device with it, except that the device without it must connect to the portal to inform the user of his/her database contents. The media player device of this type may have some local memory in which a playlist of media assets can be stored. The locally stored playlist would contain a subset of the user's complete on-line database.

Figure 5:
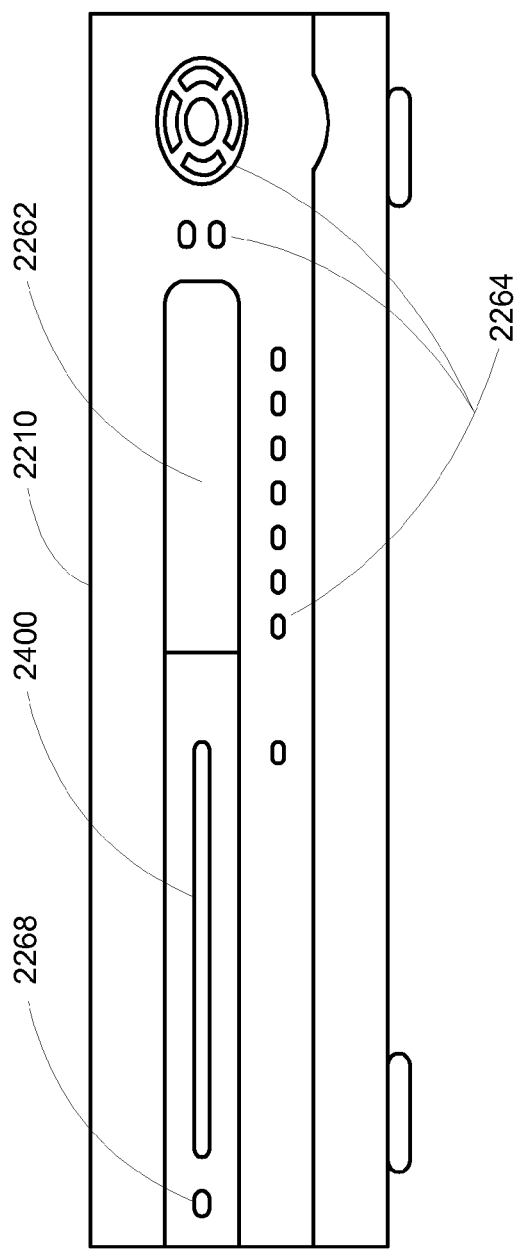
FIG. 5 is a view of a front panel of a media player device.
Figure 6:
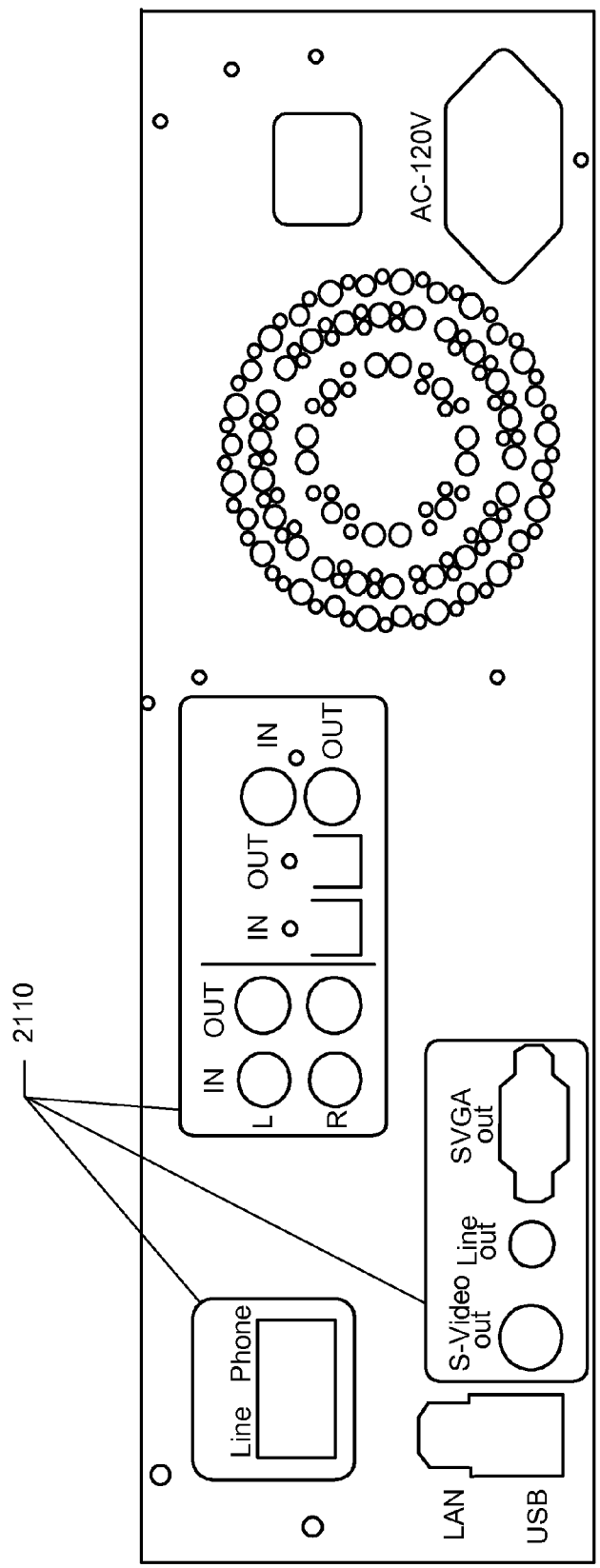
FIG. 6 is a view of a back panel of a media player device.
Figure 7:
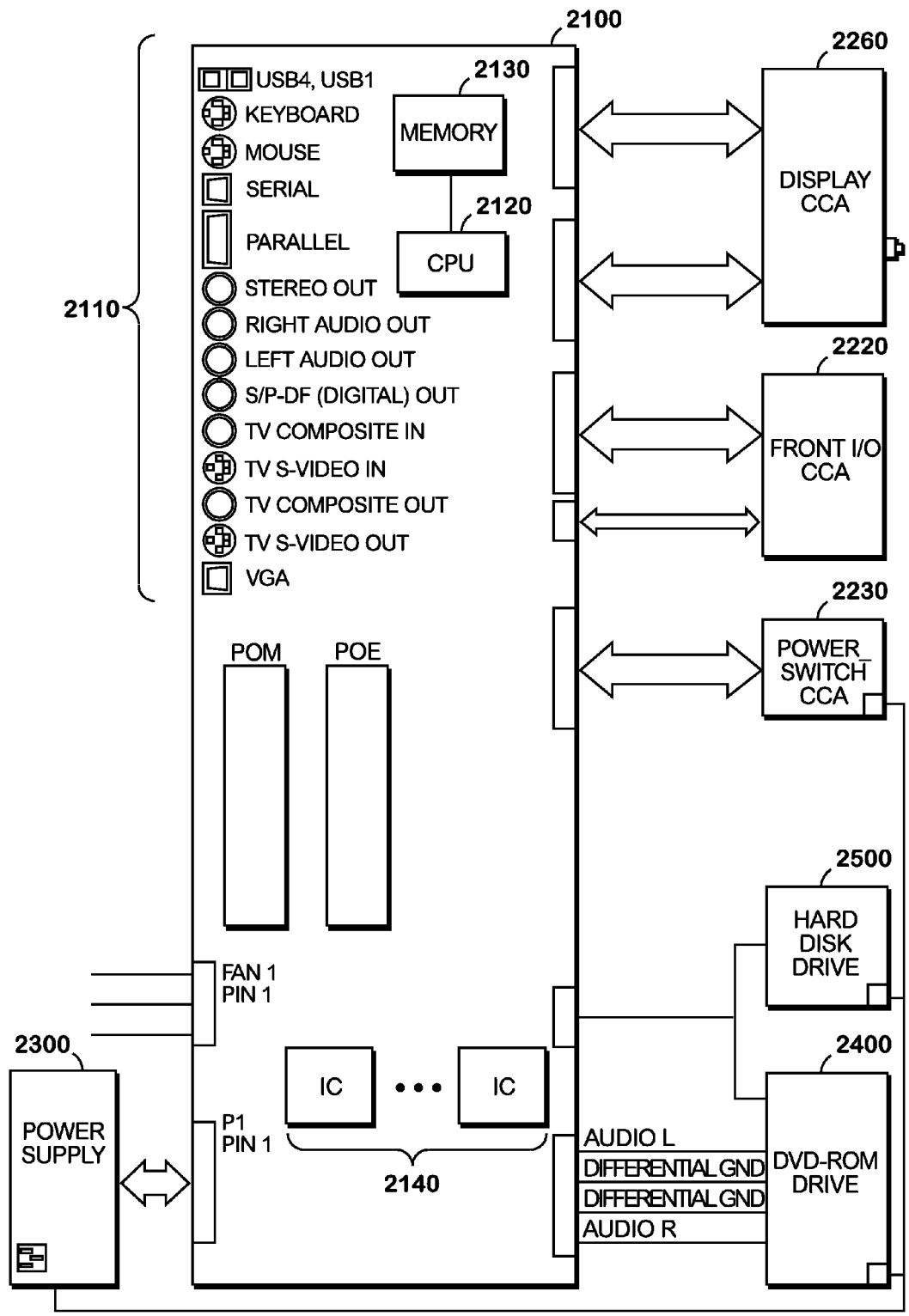
FIG. 7 is a block diagram of a media player device.

Referring now to FIGS. 5-7, an example of a hardware platform 250 for a media player device 200 of the home consumer variety 210 will be described in further detail. Many of the hardware components shown in FIGS. 5-7 would also be present in other types of media player devices (such as those shown in FIG. 1) depending on cost and feature requirements. In some cases, additional components such as an amplifier, speaker and display would be included as part of the media player hardware platform Generally, the media player device 210 is a stand-alone multimedia server. It is intended to be roughly the size of a CD/DVD Player and provide for both audio and video output, though its size may vary with specific applications. The audio output may require an amplifier to drive speakers, or an amplifier may be included within the device. Video is directed to a television or monitor. The media player device receives its media assets via broadband demand download or stream, traditional phone line download or stream from the portal and/or other media partners. The media player device is also able to download content and information from other Internet web sites through its embedded browser interface. Moreover, the media player device can playback locally stored media assets such as CDs, DVDs, or other physical media as well as media assets stored on a local hard drive storage device. The particular hardware platform 250 for a media player device 200 shown in FIGS. 5-7 is intended to complement the existing stereo and audio-visual components within the home environment. The video interface of the media player device may support NTSC and PAL analog video signal standards, as well as HDTV or other digital TV standards. In addition, the media player device can support various audio signal formats, such as Dolby and DTS theater sound formats.

The hardware platform 250 comprises several major components and assemblies.

A Front Panel Assembly 2210 comprises a display circuit assembly 2260 that drives a display 2262 and generates control signals from user input buttons 2264 and from an infrared receiver 2264; a front I/O circuit assembly 2220 and a power switch circuit assembly 2230. The display is, for example, a vacuum fluorescent display.

A Power Supply Assembly 2300 connects to a standard household power outlet and generates all of the necessary voltages and grounds for the components of the media player device.

A removable memory media drive device, such as DVD-ROM drive assembly 2400, or other suitable removable memory media drive device heretofore known or hereinafter developed is provided. The "DVD format is an example of a suitable drive assembly. Others removable memory media drive devices are CD-read, CD-read/write, DVD audio, DVD read/write, etc.

In addition, a hard disk drive 2500 is provided for storing media content and other information.

As shown in FIG. 5, the front panel comprises the display 2262, user interface buttons 2264, a power on/off switch 2268, and the tray or slot for the removable memory media drive 2400. In addition, a swing-open door reveals (not shown) USB type 'A' stacked ports, IEEE-1394 port, PC-Card ports, Smart Card port, and ¼" headphone audio jack with headphone volume adjustment knob.

The rear panel is show in FIG. 6. The rear panel exposes the I/O connections 2110, including, USB, LAN, PHONE LINE IN, SERIAL, VGA OUT, Composite Video IN, S-Video IN, Audio OUT Left, Audio OUT Right, Composite Video OUT, S-Video OUT, Digital Audio, AC ~120V.

As shown in FIG. 7, a motherboard assembly 2100 comprises the CPU 2120, memory 2130, special purpose chip sets 2140, and I/O connectors 2110. All processing excluding a processor on the display circuit assembly 2260 is controlled by the motherboard. Examples of the special purpose chip sets 2140 are Integrated Video Chipset with NTSC/PAL, S-Video, and SVGA out, Macrovision CSS for NTSC/PAL and S-Video Out, Integrated Stereo Audio Chipset with Stereo Line out, Integrated DVD/MPEG Video decoder hardware, Integrated DVD/MPEG Audio decoder hardware, 10Base-T Ethernet, 56 Kb V.90 modem, USB hardware to support 2 Type 'A' ports on rear, USB hardware to support 2 Type 'A' ports on front, IEEE-1394 hardware to support one front port, hardware to support 1 internal serial port (header), hardware to support 2 IDE drive ports (2 headers, 4 devices total).

The display circuit assembly 2260 includes firmware to perform functions such as, de-bouncing momentary switches, reporting user-input switch contact and release to motherboard via COM port, reporting removable memory media device 'EJECT' switch signal to motherboard via COM port, routing remote control and/or wireless keyboard commands to the motherboard, and managing the display.

The front panel circuit assembly 2220 manages interactions with the headphone jack, headphone volume attenuator control, dual type 'A' USB ports, and an IEEE-1394 connector. The remote control 214 (FIG. 1) has several buttons and examples of 20 some of their associated functions are listed in the table provide in the parent application which is incorporated herein by reference.

Figure 8:
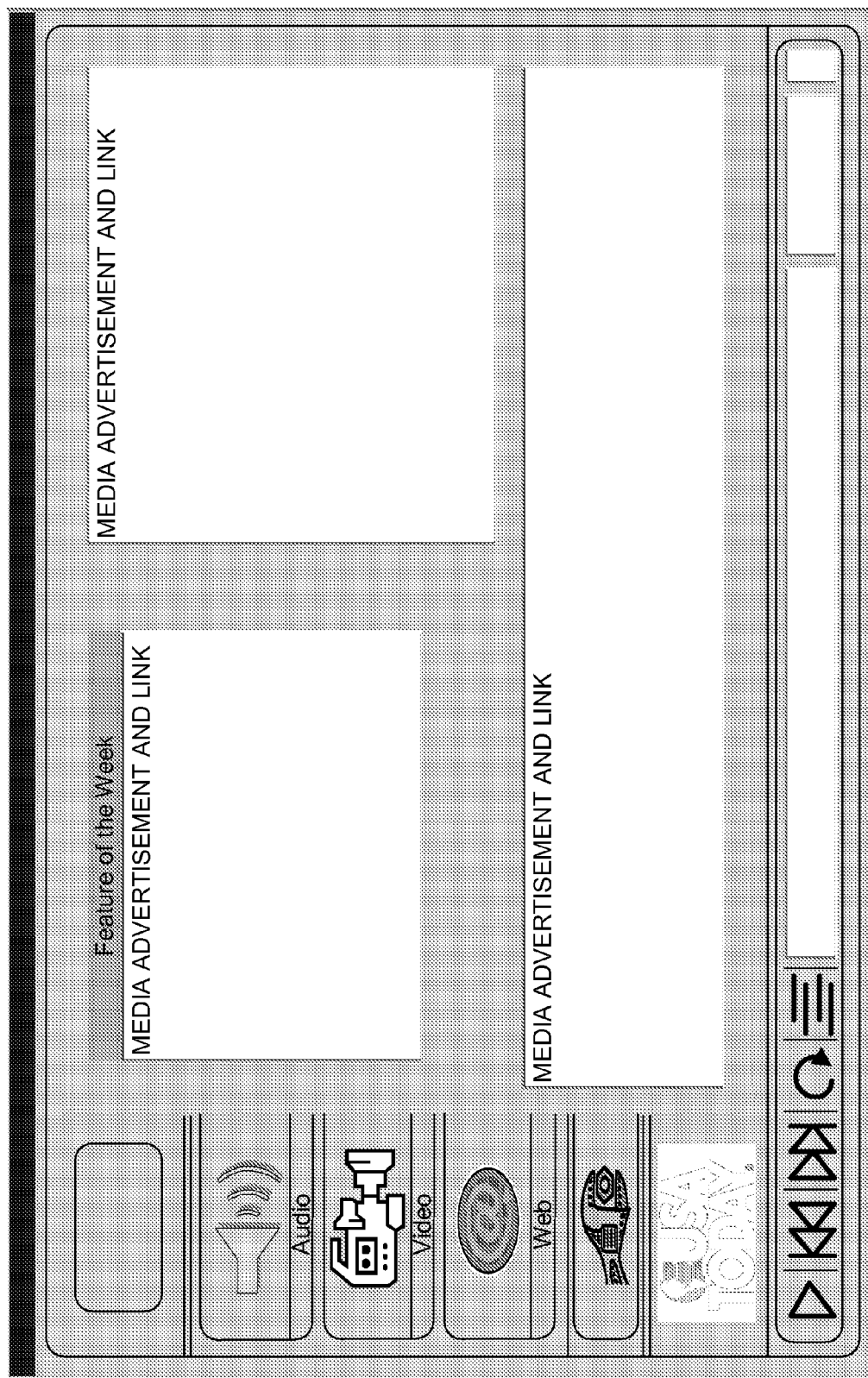
FIG. 8 is an example of a user interface screen for the media player software application.

The media player software engine provides the media playback functionality for the media player device. An example of the user interface provided by the media player software engine is shown in FIG. 8. There are icons associated with audio, video and web resources as well as one or more areas dedicated to advertisements and links. In addition, at the bottom of FIG. 8 are shown icons associated with the basic playback functions of a media asset, such as audio or video. There are several modes of operation that are controlled by the media player software engine described below. It should be understood that the media player software engine allows multiple modes to be performed at the same time. For example, a user, while using a media asset, may perform other functions such as web browsing or organizing a media asset library, etc.

Local Playback Mode

In this mode, the media player engine lays assets that reside on locally internal hard drives, CD, DVD, floppy or other removable media. Music is played back in this configuration as a background task. Other applications can function in the foreground.

Network Playback Mode

In this mode, the media player device is connected to a networked server or a mounted hard drive on a computer, which is on its local network. A media player device is capable of playing media assets in this mode from any connected server. Other media player devices can access server data. Server data is only "referenced" by the media player software engine and not "managed," i.e., data can be removed by any network member with appropriate privileges.

Internet Streaming Mode

In this mode, the media player device interacts with an Internet-based source for music or video, such as the portal or other sites capable of streaming audio or video data.

The media player device is capable of adding URL reference to its playlist. Streaming data formats include MP3, EPAC, Windows Media Audio and Video, Flash, QuickTime and REAL audio and REAL video.

Streaming Channels

The media player presents the user with a mix of preset streaming channels. The user can edit this list of channels and add or delete files to the list. These streaming channels can be either digital radio channels or streaming video channels.

Navigate Streams

This feature provides the ability to rewind and restart streaming media. The media player provides the functionality by caching the datastream in memory or on disk for later playback.

Audio Playback

This feature provides core functionality to the media player. Several formats are supported along with the standard VCR type of controls.

Typical formats are:

MP3 Audio—Various bit rates

LUCENT EPAC—Various bit rates

WAV

Macintosh Audio Format

REAL

Windows Media Player

Video Playback

Digital video can be played back in a small window or full screen. The playback window is resizable for user preference. Examples of digital video formats are, MPEG 1, 2 & 4, and QuickTime formats on Windows and Macintosh.

Integrated Internet Browser

From within the media player a user can access various Internet sites and download music and video assets. Alternately, a user can access secure items from the 25 portal that integrate into the user's virtual media asset library.

CD Playback and Record

Standard CDs can be played and recorded on the media player device.

Features include:

Listen while record.

Security restrictions for upload to portal.

Record to MP3 or other proprietary or non-proprietary format.

CD's title is automatically identified from an identification database that is either local to the portal or is remotely accessed by the portal via the Internet.

Maintain local CD recognition database of personal CD names, titles, tracks and other information.

Lyrics can be automatically added as MetaData from various servers (local or remote) that provide lyric information.

Store CD information in local database.

Maintain CD library catalog in database.

PEG, BMP & PICT album covers can be associated.

Full CD control functionality.

Similar functions can be provided for DVD and Video CD playback.

CD Recognition

This feature involves automatically accessing a local table or an Internet service that associates title and track information to CDs. The media player device automatically identifies a disc in the device. CD information is incorporated into client database in media player device and displayed during playback of the media asset.

MetaData Database

Any music or video file in the media player can have an extensive database of MetaData referenced to it. This data can be referenced in many views and may include images, lyrics, notes, rights restrictions, and URLs. All data is searchable and reportable and is incorporated into client database of media player device.

Playback Construction

A user may create a playlist manually from a master database or generate playlists randomly based on database searches. Advanced hierarchical views provided for extreme flexibility.

Features include:

View as text list, small icon or large icon views.

Drag & drop building.

Compute total playing time for making CDs timed list for events.

Loop playlist.

Play with scan mode to listen to "x" seconds of a song or video.

Data is incorporated into client database of media player device.

The Virtual Media Asset Library

The client database application of the media player can replicate its database list to the portal for virtual asset sharing. The client database application is, for example, 8iLite Oracle or SQL database software. The client database application allows the media player user to access files stored at the portal in his/her virtual media asset library. Additionally, merchants can elect to sell digital media asset along with the sale of, for example, a hardcopy CD or Video. This feature can provide an additional revenue stream to the record companies as well as to the CD retailers. The client database in the media player and the master media library database communicate and interact to provide automatic replication and synchronization.

The media player device contacts the portal periodically (such as daily, multiple times during the day, etc.) or on demand to synchronize its database application with that of the portal. A network protocol, such as for example XML-RPC, is used to synchronize the databases.

More specifically, each account on the portal has one or more media player devices associated with it, and one or more users associated with a given account.

Users on any media player device may have access to assets on any other media player device associated with that account or of unrelated users so long as licensing rights are tracked and managed. This system of mutual interdependency is one feature of the virtual media asset library. At the portal, a user's portion of the master media library 5 database is referred to as his/her virtual account.

When an asset or its metadata is added, modified or deleted from a media player device, this change is replicated to the portal in the synchronization process.

Figure 9:
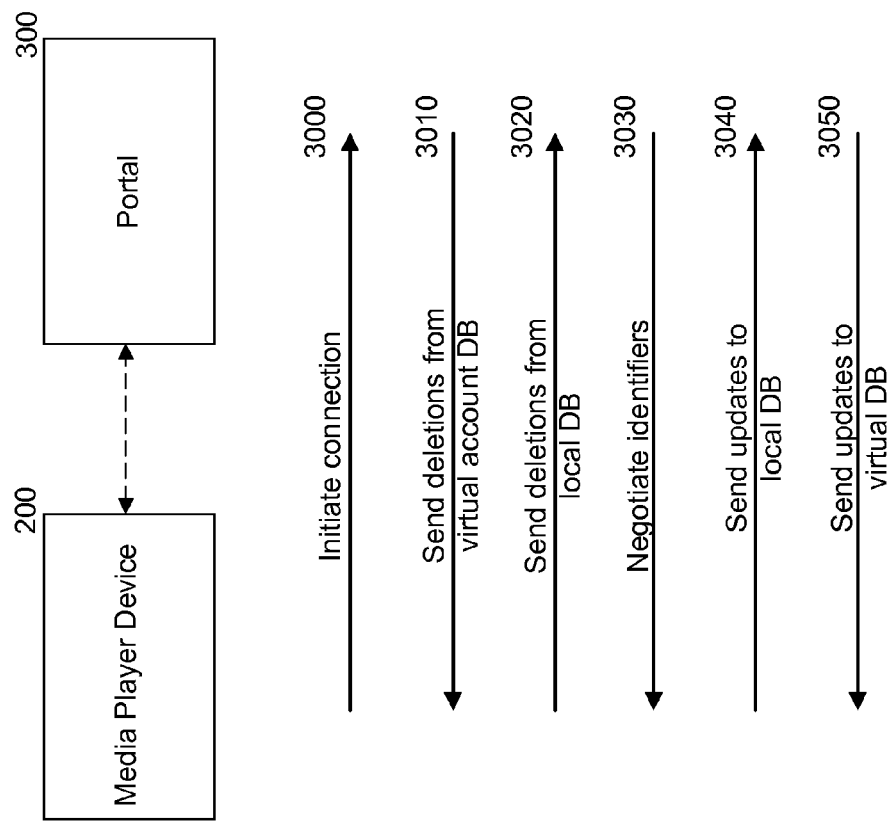
FIG. 9 is a flow chart that illustrates a synchronization process of media assets between a media player device and the portal.

The client media player device initiates synchronization with the portal. With reference to FIG. 9, first in step 3000, the client media player device initiates synchronization with the portal. Next, in step 3010 the portal forwards any asset deletions from the corresponding virtual account in the master library database to the client media player device. In step 3020, the client media player device sends any asset deletions from the local database to the portal. In step 3030, the client media player device negotiates identifiers for new media assets with the portal. In step 3040, the client media player device sends all updates of the local database (additions and changes) to the portal. In step 3050, the portal sends all updates of the corresponding virtual account in the master library database (additions and changes) to the client media player device.

Operation of the System

An example of how the system operates to distribute digital media assets from a media source 100 to a media player 200 is now described with reference to FIGS. 1-3. Initially, a user becomes a member or subscriber to a portal 300, at which time his or her identity is initialized, and he/she is issued a user-specific password. Once a membership exists, a virtual private media asset database is created and associated with the user's login account and password in the portal. The user's virtual media asset library represents an intersection of the media assets in the master media library database 330 and those assets that the user has licensed rights to. The synchronization process is described above. The master media library database 330 need not locally store all of the media assets; in some cases the master media library database 330 will maintain a reference to the media asset that is stored by a media source 100 and accessed by the portal 300 as needed to satisfy the needs of users.

The portal 300 may distribute digital media assets, that is download them in their entirety, to a client media player device for use on that device subject to the licensing rights associated therewith. Alternatively, the portal 300 may stream the digital media assets to a client media player. A user's rights with respect to the digital media is either limited term, non-exclusive licensing rights (similar, for example, to a two-day movie rental in the bricks and mortar world) or indefinite term, non-exclusive licensing rights (similar, for example, to a CD purchase in the bricks and mortar world). The portal applies a series of rights management rules associated with each user's tagged digital media assets to limit the user's access to and use to those periods to which the user's licensed rights of those assets applies. Depending upon the specific licensing arrangement between a digital media asset owner and the user, the rights management rules can provide for a limited number of plays or uses of a particular asset, a limited number of days during which the asset can be used, or a limited number of other individuals with which the user may share the asset.

The system according to the present invention permits users to download their licensed digital media assets to secure client media player devices and to use their licensed digital media assets on those devices. As with the physical use of a CD in the bricks and mortar world, a user will have access to use his or her licensed assets on other infotainment devices that he or she owns or uses, provided those other client media player devices are registered within the portal as being authorized to use the user's licensed assets.

It has been recognized that the media industry has mandated that distribution of artists' intellectual property must be protected from piracy in order for the industry to adopt Internet-based distribution methods. The system and method of the present invention optionally allow for security against asset piracy by one or more methods: watermarking, encryption, and object encapsulation. Moreover, as discussed above, the system includes rights management information to allow for use based on pre-negotiated rules.

A digital media asset may be encrypted for general protection when the asset is first entered as an object within the main library database server. Upon the request for 5 download (or streaming access) by a user, the asset may be watermarked to coincide with the serial number of the user's family of client media player devices. Each client media player device that the user owns becomes a licensed playback device for his or her registered multimedia assets if the scope of that license so permits. For example, if a user owns five client media player devices capable of running the playback engine, the user will have access to those assets from one client media player device to another in seamless fashion. This example illustrates a capability of the system of the present invention to move or copy an asset from any home, car, portable, computer, or other computing device. Each client media player device has a stored protection key that is capable of decrypting and executing the object that has been downloaded to the player. Each client media player device key is unique, but will have some level of identity with the other client media player devices used by the user's family of devices. From an auditing and security standpoint, each client media player device maintains a log of its playback or use activity for purposes of reconciliation with the media library database server application. From the point of download of the asset forward, the asset will be associated with and licensed to the user's family of client media player devices. Furthermore, with the permission of a digital media asset owner or licensor, a user may be granted the right to loan or forward his or her licensed media assets to another person that is not a registered user of the system. The forwarded asset is encapsulated in an executable file that allows for the object's integration into the recipient's media players, provided the players are compatible with the media player technology of the system. If compatibility exists, the recipient will have the executable rights associated with this object. That is to say that if the rights of the object include an ability to play the asset only once, then the asset will play or be used once, and further actions will be disabled. In the event that compatibility does not exist or the recipient's device does not have a media player, the object will prompt for the optional download of a media player engine software application. In addition, the object will offer the possibility of membership to the system to allow for the recipient's use of this asset, as well as the recipient's possible downloading and use of other digital media assets.

If a user has previously purchased a physical media asset, the system allows for the introduction of that asset ownership into the database of the portal, in addition to the normal use of the asset in the media player device. An asset stored locally on a media player (on hard drive or other memory media such as CD or DVD) can be identified and uploaded to the portal for use on other authorized media player devices of that user. For example, a user may "rip" a CD or DVD into digital files that can be uploaded to the portal. As another example, the user presents his/her physical media asset (such as a CD) to a conversion operator (e.g., at a retail music store) who: (1) defaces the user's asset in a minimal fashion (which does not affect is usability) to ensure against improper conversion of the asset by another person; and (2) simultaneously registers the asset with the portal. This registration process establishes an ownership reference for the user with the media library database server and adds the converted asset to the user's virtual media asset library. Once this media asset has been added, the user or any user within the user's family will have access rights to the asset based on the rights conferred at the time of conversion. The rights associated with each such asset could possibly be different based on the original content creator's license.

Figure 10:
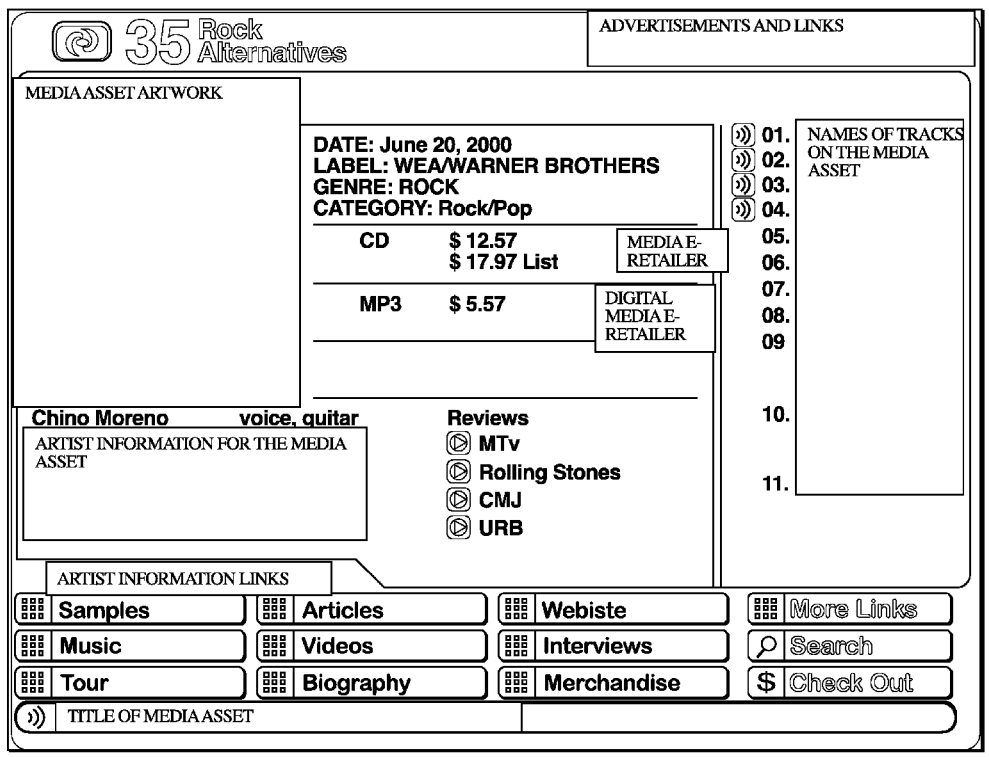
FIG. 10 is an example of a world wide web page showing how rights to a media asset may be purchased over the Internet according to the present invention.

With reference to FIG. 10, according to a further aspect of the invention, a method or model is provided both to satisfy the music industry's piracy concerns and to provide an entirely new revenue source for the industry. This business model (distribution method) allows the consumer to purchase on-line virtual access rights with respect to each one of a consumer's purchased physical media assets. That is to say that a consumer who is a user of the system according to the invention can, for an appropriate fee, access each of his or her media assets anytime and anywhere the consumer has an Internet-enabled client media player device. This method assumes for the music industry, for example, that consumers will continue to purchase physical media music assets, but will have the option of paying an additional licensing fee ($5.57, for example) for on-line virtual access rights to those music assets. FIG. 10 shows an example by which a user, through the portal, orders an audio CD from a media e-retailer, and is given the option to purchase digital access rights from a digital media e-retailer. The additional licensing fee per digital media asset is shared with the portal operator, participating e-retailers, and media asset (music) content owners. In exchange for the additional licensing fee, a "tag" would be associated with those digital media assets on the master media library database server with a notation that a particular user's media player devices are entitled to play or usage rights for those digital media assets.

It is further envisioned that each user may have up to some maximum number of eligible client media player devices (e.g., a desktop computer at home, a notebook personal computer at work, a DVD set top box, a vehicle-based device, and a handheld portable device), for which user will pay the system operator a monthly membership fee in order to have on-line virtual access services during any particular month. Consumers will find value in the automatic synchronization of the contents of their various media players, which allows them to gain access to all of their media assets from any player at any time. Finally, users may, subject to a licensing fee, convert their existing libraries of physical music assets (e.g., CDs and cassette tapes) to on-line virtually accessible assets.

Figure 11:
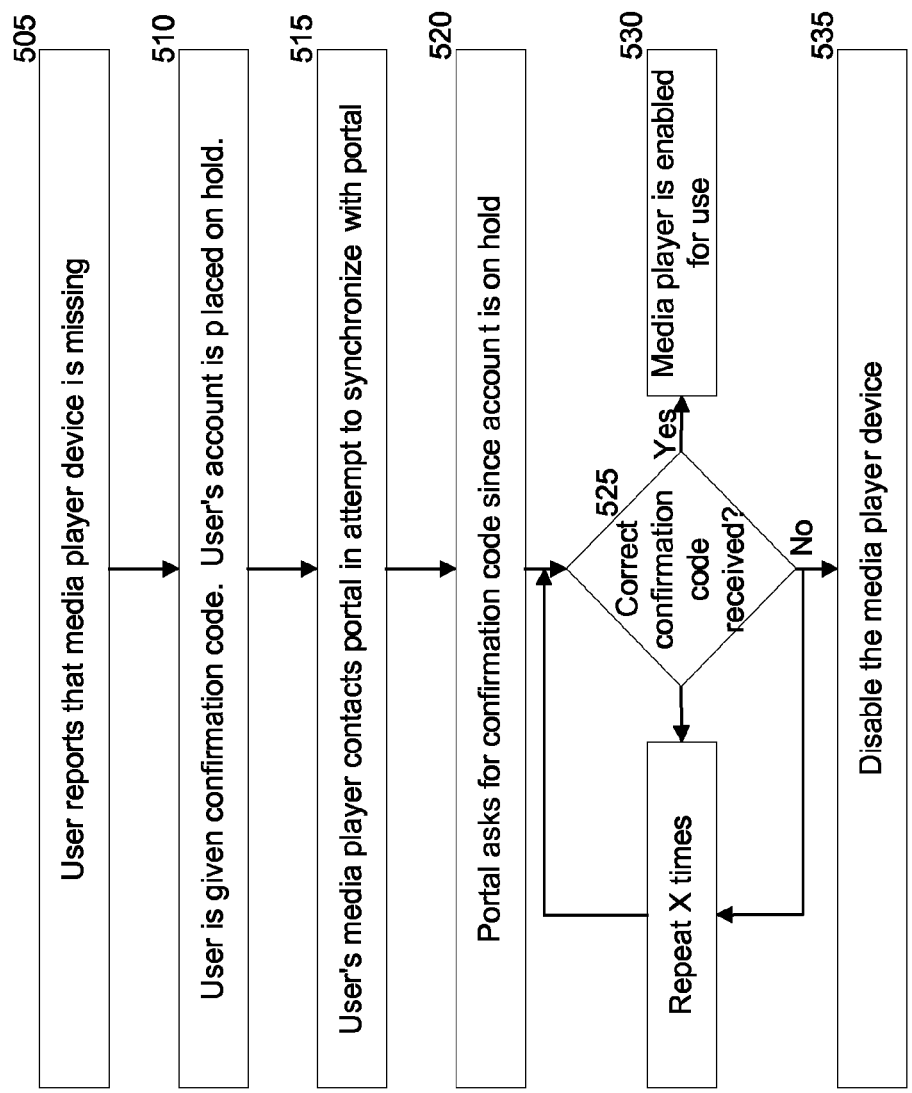
FIG. 11 is a flow chart illustrating a security lock-out feature of a media player according to an aspect of the present invention.

Referring to FIG. 11, a security lockout procedure 500 according to the invention will be described. To protect the usage of a digital media asset and a media player device, the security lockout procedure is provided to lockout unauthorized media player devices. Media player devices contact the portal for database synchronization, etc., when they are powered on, and periodically thereafter. If a media player device is stolen or missing, in step 505, a user contacts the portal (electronically via email, via telephone, etc.) and reports that the media player device is stolen or missing. In step 510, the portal puts the user's account on hold and issues the user a confirmation code. The user is then instructed to power cycle each of his/her media player devices. In step 515, the user's media players contact the portal in attempt to synchronize with the portal. Before synchronizing, in step 520, the portal will cause the media player to ask the user for the confirmation code since the user's account has been put on hold. In step 525, the portal determines whether the correct confirmation code has been received from the media player device. If it has, the media player device is enabled for use in step 530. If the correct confirmation code is not received from a user of a media player device after a certain number of attempts, that meha player device is disabled and no longer usable unless completely re-enabled. The above description is intended by way of example only.

What is claimed is:

1. A media management system comprising:
a record created by the media management system and corresponding to at least one user, the record being stored by the media management system on at least one server computer;
the media management system placing within the record, references to a plurality of media assets and references to one or more media player devices of said user; and
a server application accessible over a network and configured to access said record on the at least one server and recognize said one or more media player devices of said user as being referenced in said record,
wherein the media management system enables at least the said one or more media player devices referenced in said record to play one or more of said plurality of media assets referenced in said record; and
the server application being communicatively coupled with a client application residing on at least one of the media player devices that are referenced in said record and the server application operating to assist said at least one media player device to play one or more of said media assets referenced in said record.

2. The system of claim 1, wherein said references to said plurality of media assets includes a user playlist.

3. The system of claim 1, wherein said record includes a list of media genres.

4. The system of claim 1 wherein said references to said plurality of media assets includes at least a plurality of uniform resource locators corresponding to said media assets.

5. The system of claim 1, wherein said first media player device is selected from a group of media player devices comprising a computer, portable media player device and mobile telephone of said first user.

6. The system of claim 5, wherein said second media player device is selected from a group of media player devices comprising a computer, portable media player device and mobile telephone of said first user.

7. The system of claim 6, wherein said record limits the number of media player devices of said user to a maximum number of media player devices of said first user.

8. The system of claim 6, wherein once a third media player device of said user has been used to provide login and password information of said user to at least one of said server applications, said server application facilitates the download of one or more media assets referenced in the record by said user to said third media player device, regardless of whether said device has been referenced in said record.

9. The system of claim 6, wherein said system impedes the ability of a media player device to play one or more of said referenced media assets.

10. The system of claim 6, further comprising a user-personalized view permitting said user to see instances of profile information for said user, including media assets referenced in said record of said user.

11. The system of claim 6, further comprising a server application which generates media-specific suggestions for said user based on media preference information of said user.

12. The system of claim 6, where said media assets are presented to said first media player device by at least one of downloading and streaming.

13. A media management system comprising:
a record created by the media management system and including information corresponding to at least one user, the record being provided to and stored on at least one server computer;
the media management system placing within the record, references to a plurality of media assets and references to one or more media player devices of said user; and
a server application accessible over a network and configured to recognize said one or more media player devices of said user as being referenced in said record,
wherein the media management system enables at least said one or more media player devices referenced in said record to play one or more of said plurality of media assets referenced in said record; and
a server application communicatively coupled with an application residing on at least one of the referenced media player devices and assisting said media player device to play one or more of said referenced media assets.

* * * * *